(12) United States Patent
Svendsen et al.

(10) Patent No.: US 11,402,969 B2
(45) Date of Patent: *Aug. 2, 2022

(54) MULTI-SOURCE JOURNAL CONTENT INTEGRATION SYSTEMS AND METHODS AND SYSTEMS AND METHODS FOR COLLABORATIVE ONLINE CONTENT EDITING

(71) Applicant: WeVideo, Inc., Mountain View, CA (US)

(72) Inventors: Jostein Svendsen, Saratoga, CA (US); Bjorn Rustberggaard, Nesoya (NO)

(73) Assignee: WEVIDEO, INC., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/990,961

(22) Filed: Aug. 11, 2020

(65) Prior Publication Data

US 2021/0109630 A1 Apr. 15, 2021

Related U.S. Application Data

(63) Continuation of application No. 15/201,610, filed on Jul. 4, 2016, now Pat. No. 10,739,941, which is a (Continued)

(51) Int. Cl.
*G06F 3/0482* (2013.01)
*G06Q 20/10* (2012.01)
(Continued)

(52) U.S. Cl.
CPC ........ *G06F 3/0482* (2013.01); *G06F 3/04817* (2013.01); *G06F 16/951* (2019.01);
(Continued)

(58) Field of Classification Search
CPC .... G06F 3/0482; G06F 3/04817; G06F 16/70; G06F 16/951; G06F 17/24; H04N 21/222;
(Continued)

(56) References Cited

U.S. PATENT DOCUMENTS

| 4,932,054 A | 6/1990 | Chou |
| 4,977,594 A | 12/1990 | Shear |

(Continued)

OTHER PUBLICATIONS

Apple Inc., "Final Cut Pro 7 User Manual," pp. 1-2, 1553-1583, 1995-2030, (2010).

(Continued)

*Primary Examiner* — Mong-Shune Chung
(74) *Attorney, Agent, or Firm* — Ahmann Kloke LLP

(57) ABSTRACT

The paper discloses a system including a multi-source content acquisition engine configured to provide an instruction to launch an editor window to display a set of selectable content from user-generated content generated by a plurality of remote sources and stored in a content datastore. The system includes a multi-source content selection configured to identify a set of selected content from the set of selectable content. The system includes an integrated content arrangement engine configured to arrange the set of selected content into a multi-sourced journal content sequence. The system includes a layer integration engine configured to apply a layer from the layer datastore to a portion of the multi-sourced journal content sequence. The system includes a multi-source content launch engine configured to provide an instruction to display an integrated multi-sourced journal content sequence including the multi-sourced journal content sequence and the layer in the editor window.

18 Claims, 19 Drawing Sheets

Related U.S. Application Data continuation-in-part of application No. 13/434,709, filed on Mar. 29, 2012, now Pat. No. 9,460,752, which is a continuation-in-part of application No. 13/506,156, filed on Mar. 29, 2012, now abandoned.

(60) Provisional application No. 61/564,256, filed on Nov. 28, 2011, provisional application No. 61/564,261, filed on Nov. 28, 2011, provisional application No. 61/564,257, filed on Nov. 28, 2011, provisional application No. 61/468,725, filed on Mar. 29, 2011.

(51) Int. Cl.

| | | |
|---|---|---|
| *G06F 3/04817* | (2022.01) | |
| *G06F 16/951* | (2019.01) | |
| *H04N 21/2543* | (2011.01) | |
| *H04N 21/234* | (2011.01) | |
| *G11B 27/031* | (2006.01) | |
| *G06F 16/9536* | (2019.01) | |
| *H04N 21/254* | (2011.01) | |
| *H04N 5/76* | (2006.01) | |
| *H04N 21/472* | (2011.01) | |
| *H04N 21/222* | (2011.01) | |
| *H04N 21/233* | (2011.01) | |
| *G06F 40/166* | (2020.01) | |

(52) U.S. Cl.
CPC ........ *G06F 16/9536* (2019.01); *G06F 40/166* (2020.01); *G06Q 20/10* (2013.01); *G11B 27/031* (2013.01); *H04N 5/76* (2013.01); *H04N 21/222* (2013.01); *H04N 21/233* (2013.01); *H04N 21/23424* (2013.01); *H04N 21/2541* (2013.01); *H04N 21/25435* (2013.01); *H04N 21/47205* (2013.01)

(58) Field of Classification Search
CPC ........... H04N 21/47205; H04N 21/233; H04N 21/2541; H04N 21/23424; H04N 21/25435; H04N 5/76; G11B 27/031; G06Q 20/10
See application file for complete search history.

(56) References Cited

U.S. PATENT DOCUMENTS

| | | | |
|---|---|---|---|
| 5,247,575 A | 9/1993 | Sprague | |
| 5,841,512 A | 11/1998 | Goodhill | |
| 6,351,765 B1* | 2/2002 | Pietropaolo | G11B 27/034 348/722 |
| 6,388,668 B1 | 5/2002 | Elliott | |
| 6,442,283 B1 | 8/2002 | Tewfik | |
| 6,546,188 B1 | 4/2003 | Ishii | |
| 7,120,859 B2 | 10/2006 | Wettach | |
| 7,213,051 B2* | 5/2007 | Zhu | H04L 12/1831 709/204 |
| 7,375,768 B2 | 5/2008 | Herberger | |
| 7,437,673 B2 | 10/2008 | Hyman | |
| 7,587,509 B1 | 9/2009 | Edelman | |
| 7,594,039 B2 | 9/2009 | Shima | |
| 7,617,278 B1 | 11/2009 | Edelman | |
| 7,769,819 B2 | 8/2010 | Lerman | |
| 7,809,802 B2 | 10/2010 | Lerman | |
| 7,840,661 B2 | 11/2010 | Kalaboukis | |
| 7,934,011 B2 | 4/2011 | Gavin | |
| 7,945,615 B1 | 5/2011 | Shetty | |
| 7,945,916 B1 | 5/2011 | Lozben | |
| 8,051,287 B2 | 11/2011 | Shetty | |
| 8,136,127 B1 | 3/2012 | Lozben | |
| 8,156,176 B2 | 4/2012 | Lerman | |
| 8,161,159 B1 | 4/2012 | Shetty | |
| 8,166,191 B1 | 4/2012 | Swaminathan | |
| 8,176,115 B2 | 5/2012 | Eves | |
| 8,205,154 B2 | 6/2012 | Doepke | |
| 8,209,611 B2 | 6/2012 | Yoshimine | |
| 8,209,618 B2 | 6/2012 | Garofalo | |
| 8,218,830 B2 | 7/2012 | Gavin | |
| 8,225,228 B2 | 7/2012 | Marinkovich | |
| 8,245,188 B2 | 8/2012 | Hertenstein | |
| 8,265,457 B2 | 9/2012 | Baum | |
| 8,270,815 B2 | 9/2012 | Yen | |
| 8,286,069 B2 | 10/2012 | Gavin | |
| 8,302,008 B2 | 10/2012 | Hertenstein | |
| 8,331,735 B2 | 12/2012 | Lee | |
| 8,341,525 B1 | 12/2012 | Achour | |
| 8,411,758 B2 | 4/2013 | Folgner | |
| 8,412,841 B1 | 4/2013 | Swaminathan | |
| 8,422,852 B2 | 4/2013 | Suri | |
| 8,433,611 B2 | 4/2013 | Lax | |
| 8,451,276 B2 | 5/2013 | Jung | |
| 8,495,092 B2 | 7/2013 | Piccionelli | |
| 8,510,441 B2 | 8/2013 | Ooi | |
| 8,532,469 B2 | 9/2013 | Fiumi | |
| 8,577,204 B2 | 11/2013 | Lin | |
| 8,639,086 B2 | 1/2014 | Chen | |
| 8,667,016 B2 | 3/2014 | Sims | |
| 8,667,532 B2 | 3/2014 | Heath | |
| 8,695,031 B2 | 4/2014 | Kumar | |
| 8,719,865 B2 | 5/2014 | Moonka | |
| 8,749,618 B2 | 6/2014 | Fiumi | |
| 8,788,941 B2 | 7/2014 | Hedges | |
| 8,806,346 B2 | 8/2014 | Hedges | |
| 8,812,672 B2 | 8/2014 | Ramaley | |
| 8,831,999 B2 | 9/2014 | Bolton | |
| 8,868,465 B2 | 10/2014 | Folgner | |
| 8,910,045 B2 | 12/2014 | Baum | |
| 8,935,236 B2 | 1/2015 | Morita | |
| 8,935,611 B2 | 1/2015 | Oberbrunner | |
| 8,966,402 B2 | 2/2015 | Lu | |
| 8,984,406 B2 | 3/2015 | Pueyo | |
| 9,009,581 B2 | 4/2015 | Herberger | |
| 9,026,446 B2 | 5/2015 | Fiumi | |
| 9,032,297 B2 | 5/2015 | Lovejoy | |
| 9,032,298 B2 | 5/2015 | Segal | |
| 2001/0041050 A1 | 11/2001 | Iwata | |
| 2002/0083324 A1 | 6/2002 | Hirai | |
| 2002/0116716 A1 | 8/2002 | Sideman | |
| 2002/0144130 A1 | 10/2002 | Rosner | |
| 2002/0181732 A1 | 10/2002 | Safavi-Naini | |
| 2002/0181738 A1 | 12/2002 | Nakamura | |
| 2003/0233462 A1 | 12/2003 | Chien | |
| 2004/0078825 A1 | 4/2004 | Murphy | |
| 2005/0289068 A1 | 12/2005 | Stefik | |
| 2006/0251383 A1 | 11/2006 | Vronay | |
| 2006/0259589 A1 | 11/2006 | Lerman | |
| 2007/0106419 A1 | 5/2007 | Rachamadugu | |
| 2007/0107032 A1 | 5/2007 | Rachamadugu | |
| 2007/0162855 A1 | 7/2007 | Hawk | |
| 2007/0179979 A1 | 8/2007 | Folgner | |
| 2007/0208442 A1 | 9/2007 | Perrone | |
| 2007/0250901 A1 | 10/2007 | McIntire | |
| 2007/0277108 A1 | 11/2007 | Orgill | |
| 2007/0300158 A1 | 12/2007 | Kasperkiewicz | |
| 2008/0065771 A1 | 3/2008 | Marvit | |
| 2008/0112683 A1 | 3/2008 | Lin | |
| 2008/0123976 A1 | 5/2008 | Coombs | |
| 2008/0155614 A1 | 6/2008 | Cooper | |
| 2008/0165388 A1 | 7/2008 | Serlet | |
| 2008/0183608 A1 | 7/2008 | Gavin | |
| 2008/0183844 A1 | 7/2008 | Gavin | |
| 2008/0193100 A1 | 8/2008 | Baum | |
| 2008/0208692 A1 | 8/2008 | Garaventi | |
| 2008/0301228 A1 | 12/2008 | Flavin | |
| 2009/0007267 A1 | 1/2009 | Hoffman | |
| 2009/0094147 A1 | 4/2009 | Fein | |
| 2009/0157608 A1 | 6/2009 | Strathearn | |
| 2009/0183081 A1 | 7/2009 | Rodriguez | |
| 2009/0196570 A1 | 8/2009 | Dudas | |
| 2010/0004944 A1 | 1/2010 | Palaniappan | |
| 2010/0169127 A1 | 7/2010 | Malackowski | |
| 2010/0169779 A1 | 7/2010 | Mason | |

(56) References Cited

U.S. PATENT DOCUMENTS

| | | |
|---|---|---|
| 2010/0192072 A1 | 7/2010 | Spataro |
| 2010/0226525 A1 | 9/2010 | Levy |
| 2010/0257457 A1 | 10/2010 | De Goes |
| 2010/0260468 A1* | 10/2010 | Khatib .............. H04N 21/23439 386/278 |
| 2010/0269048 A1 | 10/2010 | Pahlavan |
| 2010/0285884 A1 | 11/2010 | Gauer |
| 2011/0026898 A1* | 2/2011 | Lussier ............... G06F 3/04842 386/280 |
| 2011/0026899 A1 | 2/2011 | Lussier |
| 2011/0026900 A1 | 2/2011 | Lussier |
| 2011/0029883 A1 | 2/2011 | Lussier |
| 2011/0167353 A1 | 7/2011 | Grosz |
| 2011/0213655 A1 | 9/2011 | Henkin |
| 2011/0214045 A1 | 9/2011 | Sumler |
| 2011/0246554 A1 | 10/2011 | Bury |
| 2011/0246892 A1 | 10/2011 | Hedges |
| 2011/0282727 A1 | 11/2011 | Phan |
| 2011/0288910 A1* | 11/2011 | Garg ...................... G06Q 30/06 705/14.1 |
| 2011/0314390 A1 | 12/2011 | Park |
| 2012/0033948 A1 | 2/2012 | Rodriguez |
| 2012/0079606 A1 | 3/2012 | Evans |
| 2012/0130954 A1 | 5/2012 | Hood |
| 2012/0189282 A1 | 7/2012 | Wyatt |
| 2012/0245952 A1 | 9/2012 | Halterman |
| 2012/0251080 A1 | 10/2012 | Svendsen |
| 2012/0251083 A1 | 10/2012 | Svendsen |
| 2012/0254752 A1 | 10/2012 | Svendsen |
| 2012/0254778 A1 | 10/2012 | Svendsen |
| 2012/0284176 A1 | 11/2012 | Svendsen |
| 2012/0314025 A1 | 12/2012 | Fiumi |
| 2013/0007669 A1 | 1/2013 | Lu |
| 2013/0064110 A1 | 3/2013 | Polinati |
| 2013/0111326 A1 | 5/2013 | Lockhart |
| 2013/0132462 A1 | 5/2013 | Moorer |
| 2013/0275886 A1 | 10/2013 | Haswell |
| 2013/0311556 A1 | 11/2013 | Srivastava |
| 2014/0047413 A1 | 2/2014 | Sheive |
| 2014/0096020 A1 | 4/2014 | Grosz |
| 2014/0121017 A1 | 5/2014 | Mandryk |
| 2014/0143218 A1 | 5/2014 | Sanghavi |
| 2014/0255009 A1 | 9/2014 | Svendsen |
| 2014/0258101 A1 | 9/2014 | Svendsen |
| 2014/0317506 A1 | 10/2014 | Rustberggaard |
| 2015/0050009 A1 | 2/2015 | Svendsen |
| 2017/0131855 A1 | 5/2017 | Svendsen et al. |
| 2019/0325913 A1 | 10/2019 | Svendsen et al. |

OTHER PUBLICATIONS

Jokela, Tero et al., "Mobile Video Editor: Design and Evaluation," Proceedings of the 12th International Conference on Human-Computer Interaction: Interaction Platforms and Techniques, pp. 344-353 (Jul. 2007).

VideoToolbox.com, "Video Toolbox—advanced online video editor. Convert, crop, merge or record videos with just a few clicks," (2009) [retrieved from the Internet at http://www.videotoolbox.com/ on Apr. 10, 2014].

* cited by examiner

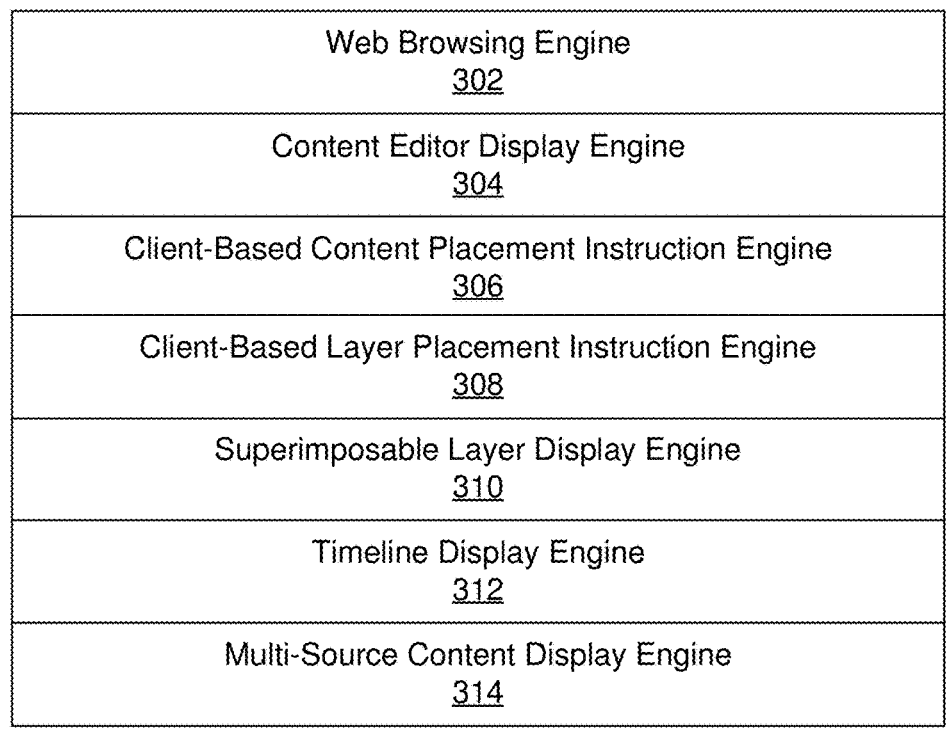
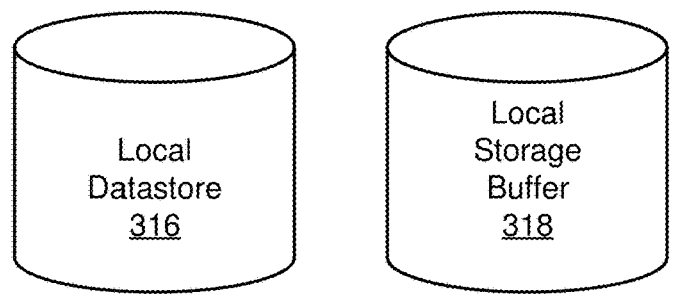
FIG. 3

MULTI-SOURCE JOURNAL CONTENT INTEGRATION SYSTEMS AND METHODS AND SYSTEMS AND METHODS FOR COLLABORATIVE ONLINE CONTENT EDITING

CROSS-REFERENCE TO RELATED APPLICATIONS

The present application is a continuation of U.S. patent application Ser. No. 15/201,610 filed Jul. 4, 2016, now U.S. Pat. No. 10,739,941, which is a continuation-in-part of U.S. patent application Ser. No. 13/506,156 filed Mar. 29, 2012 and a continuation-in-part of U.S. patent application Ser. No. 13/434,709 filed Mar. 29, 2012, now U.S. Pat. No. 9,460,752. U.S. patent application Ser. No. 13/506,156 and U.S. patent application Ser. No. 13/434,709 each claim benefit of: U.S. Provisional Patent Application Ser. No. 61/468,725 filed Mar. 29, 2011, U.S. Provisional Patent Application Ser. No. 61/564,256 filed Nov. 28, 2011, U.S. Provisional Patent Application No. Ser. 61/564,257 filed Nov. 28, 2011, and U.S. Provisional Patent Application Ser. No. 61/564,261, filed on Nov. 28, 2011. All of the foregoing applications referenced in this paragraph are hereby incorporated by reference herein.

BACKGROUND

Journalists have long captured critical narratives and personal histories that would otherwise be lost in time. Embedded in the modern consciousness are powerful images and videos of warzones, nonviolent and violent protests, and political milestones. "Personal journalists," such as personal photographers and videographers, have similarly captured births, weddings, rites of passage, and the life histories of families and communities.

Journalists conventionally went to the field with expensive and bulky equipment. A journalist would then trek back to an editing studio so that a specialized team of editors could identify publication-worthy material, incorporate special effects and incorporate narrative elements, either using physical editing equipment or locally installed editing systems. Unfortunately, physical editing systems were bulky, were expensive, and required access to film studios. Moreover, locally installed editing systems could not keep pace with the constant flow of information over sources such as the Internet, where images, video, and crucial perspectives of an event can be available in real-time from a plethora of sources. Thus, conventional journalism was unnecessarily slow and expensive. Conventional journalism generated stale messages produced by the centralized information gathering of a few major studios.

The foregoing examples of film editing systems illustrative and are not exclusive. Those of skill in the art can discern other limitations of the art after reading the specification and studying the drawings.

Generally, audio-video content editing on computer systems involves computationally intensive processes and utilizes larger than usual amounts of computing resources than other computer activities (e.g., word processing, browsing the Internet). This is particularly true when the content editing involves high definition/quality audio or video content, which are well notorious for being large in data size and process heavy during content encoding and decoding processes.

Unfortunately, due to these computing needs, high definition/quality audio-video content editing has typically been limited to powerful computing systems that tend to have the requisite computing resources to perform content editing quickly. If the same high definition/quality content editing were to be performed on a less powerful computing system, the likely result would be slower or poorer content editing performance, possibly to the point where the content editing becomes impractical or impossible. Consequently, less powerful computing systems, such as older computer systems, netbooks, and particular mobile devices, are either prevented from performing audio-video content editing, or relegated to performing audio-video content editing involving only proxy content.

Additionally, in certain situations, content editing projects involving collaboration between two or more users is desirable. Unfortunately, if such collaboration were to be facilitated using traditional high definition/quality audio-video content editing tools installed at individual computing systems, each computing system would require sufficient power to operate the tools in a proper and practical manner.

The foregoing example of trends and issues is intended to be illustrative and not exclusive. Other limitations of the art will become apparent to those of skill in the relevant art upon a reading of the specification and a study of the drawings.

SUMMARY

The present application discloses systems and methods of integrating multi-source journal content compilations. The disclosed systems and methods allow content producers to access high-quality editing tools and to chronicle images, video, and perspectives of an event in real-time from a plethora of sources, without entering film studios and without installing production tools on a local computer. The disclosed systems and methods are portable, avoid specialized or high-performance computers, keep pace with the constant flow of information over sources such as the Internet, and ultimately, democratize journalism.

Systems can include a content datastore, a layer datastore, a multi-source content acquisition engine coupled to the content datastore; a multi-source content selection engine coupled to the multi-source content acquisition engine; an integrated content arrangement engine coupled to the multi-source content selection engine; a layer integration engine coupled to the layer datastore and to the integrated content arrangement engine; and a multi-source content launch engine coupled to the layer integration engine.

In operation, the multi-source content acquisition engine provides an instruction to launch an editor window to display a set of selectable content from user-generated content generated by a plurality of remote sources and stored in the content datastore. In operation, the multi-source content selection engine identifies a set of selected content from the set of selectable content.

In operation, the integrated content arrangement engine arranges the set of selected content into a multi-sourced journal content sequence. In operation, the layer integration engine applies a layer from the layer datastore to a portion of the multi-sourced journal content sequence. In operation, the multi-source content launch engine provides an instruction to display an integrated multi-sourced journal content sequence including the multi-sourced journal content sequence and the layer in the editor window.

Systems can include a multi-source channel publication engine coupled to the layer integration engine. In operation, the multi-source channel publication engine creates a multi-source content channel comprising the integrated multi-sourced journal content sequence.

Systems can include a multi-source content search engine coupled to the content datastore and the multi-source content acquisition engine. In operation, the multi-source content search engine receives a request from the multi-source content acquisition engine to search the content datastore for subject-specific content, and provides the subject-specific content to the multi-source content acquisition engine.

Systems can include a collaborative edit aggregation engine coupled to the layer datastore and the layer integration engine. In operation, the collaborative edit aggregation engine provides to the layer integration engine a plurality of instructions comprising: a first instruction from a first remote source to apply a first layer from the layer datastore to the portion of the multi-sourced journal content sequence, and a second instruction from a second remote source to apply a second layer from the layer datastore to the portion of the multi-sourced journal content sequence.

Systems can include a collaborative edit launch engine coupled to the multi-source content acquisition engine. In operation, the collaborative edit launch engine: receives the instruction to launch the editor window from the multi-source content acquisition engine, and launches a first editor window on a first edit client and a second editor window on a second edit client based on the instruction to launch the editor window.

Systems can include a collaborative layer placement engine coupled to the layer integration engine. In operation, the collaborative layer placement engine provides to the layer integration engine a first layer received from a first editor window and a second layer received from a second editor window.

Systems can include a journalism sourcing engine coupled to the content datastore. In operation, the journalism sourcing engine provides to the content datastore: first user-generated coverage of an event obtained from a first citizen journalist, and second user-generated coverage of the event obtained from a second citizen journalist.

Systems can include a content scrapbooking engine coupled to the content datastore. In operation, the content scrapbooking engine can provide to the content datastore user-generated social history content.

Methods can include: using a multi-source content acquisition engine to provide an instruction to launch an editor window to display a set of selectable content from user-generated content generated by a plurality of remote sources and stored in a content datastore; configuring a multi-source content selection engine to identify a set of selected content from the set of selectable content; using an integrated content arrangement engine to arrange the set of selected content into a multi-sourced journal content sequence; using a layer integration engine to apply a layer from the layer datastore to a portion of the multi-sourced journal content sequence; and providing an instruction to display, using a multi-source content launch engine, an integrated multi-sourced journal content sequence including the multi-sourced journal content sequence and the layer in the editor window.

Methods can include using a multi-source channel publication engine to create a multi-sourced content channel comprising the integrated multi-sourced journal content sequence.

Methods can include using a multi-source content search engine to receive a request from the multi-source content selection engine to search the content datastore for subject-specific content. Methods can also include using the multi-source content search engine to provide the subject-specific content to the multi-source content selection engine.

Methods can include using a collaborate edit aggregation engine to provide to the layer integration engine a plurality of instructions comprising: a first instruction from a first remote source to apply a first layer from the layer datastore to the portion of the multi-sourced journal content sequence, and a second instruction from a second remote source to apply a second layer from the layer datastore to the portion of the multi-sourced journal content sequence.

Methods can include using a collaborative edit launch engine to: receive the instruction to launch the editor window from the multi-source content acquisition engine, and to launch a first editor window on a first edit client and a second editor window on a second edit client based on the instruction to launch the editor window.

Methods can include using a collaborative layer placement engine to provide to the layer integration engine a first layer received from a first editor window and a second layer received from a second editor window.

Methods can include using a journalism sourcing engine to provide to the content datastore: first user-generated coverage of an event obtained from a first citizen journalist, and second user-generated coverage of the event obtained from a second citizen journalist.

Method can include using a content scrapbooking engine to provide to the content datastore user-generated social history content.

Systems can include: means for using a multi-source content acquisition engine to provide an instruction to launch an editor window to display a set of selectable content from user-generated content generated by a plurality of remote sources and stored in a content datastore; means for configuring a multi-source content selection engine to identify a set of selected content from the set of selectable content; means for using an integrated content arrangement engine to arrange the set of selected content into a multi-sourced journal content sequence; means for using a layer integration engine to apply a layer from the layer datastore to a portion of the multi-sourced journal content sequence; and means for providing an instruction to display, using a multi-source content launch engine, an integrated multi-sourced journal content sequence including the multi-sourced journal content sequence and the layer in the editor window.

According to various embodiments, systems and methods for collaborative online content editing are provided, where collaborative content product, comprising collaboratively-created content that can include original version (also referred to as "non-proxy version" or "non-proxy") content items and/or derivative version (also referred to herein as "proxy version" or simply "proxy") content items, is created and/or modified at an collaborative online content editor server according to the modifications submitted by two or more collaborative online content editor clients. Proxy version content items can include, for example, lower quality/definition versions, copyright limited versions, or watermarked versions content items.

In various embodiments, during collaborative editing of content, the systems or methods can prepare an intermediary collaborative content product (e.g., temporary copy), based on a version (e.g., latest version) of the collaborative content product residing on a collaborative online content editor server and being collaboratively developed by two or more collaborative online content editor clients. The intermediary collaborative content product can be prepared by the server on behalf of each collaborative online content editor client that desires to update or modify the collaborative content product. Once prepared, each collaborative online content editor client can modify the collaborative content product by applying modifications to its respective intermediary collaborative content product, and having the modifications to the intermediary collaborative content product applied to the collaborative content product. Depending on the implementation, the intermediary collaborative content product can be received by a client from a server, updated/modified at the client, and the updates/modifications to the intermediary collaborative content product then sent back to the server for application to the latest version of the collaborative content product residing at the server. Alternatively, the intermediary collaborative content can be stored at the server on behalf of the client, the client instructs the server to perform update/modification operations on the intermediary content product, and server eventually applies the updates/modifications to the intermediary collaborative content product to the latest version of the collaborative content product residing at the server.

For various implementations, when two or more updates/modifications are to be applied to the collaborative content product, the updates/modification can apply the modification serially in the order in which they are received by the server, based on the priority of the update/modification, or based on the priority of the client submitting the update/modification. Where a conflict exists between two or more updates/modifications to be applied to the collaborative content product (e.g., where two or more modifications are received at or near the same time), if the modifications do not overlap, some embodiments can apply both to the collaborative content product to resolve the conflict. In some embodiments, conflicts between two or more updates/modifications can be resolved by prompting one or more users (e.g., perhaps only those users submitting the updates/modifications) for a resolution.

Those skilled in the art will appreciate that when a update/modification is applied to a latest version of the collaborative content product, the application will generally result in a new, latest version of the collaborative content product being produced that incorporates the update/modification.

For some embodiments, the collaborative content product (and, as a result, the intermediary collaborative content product) can be a proxy version or comprise proxy version content items, thereby lowering the use of network bandwidth between a collaborative online content editor client and server and possibly lowering the processing time during operations (e.g., content modification options). When the collaborative content product is rendered, the resulting rendered collaborative content product can be considered a non-proxy version of the collaborative content product, where the render collaborative content product comprises non-proxy content items in the place of proxy content items.

In some embodiments, the collaborative online content editor server or client can utilize proxy content during creation and modification operations on the user-created content, and replaces such proxy content items with corresponding non-proxy content items possibly when the collaborative content product content is rendered, when the collaborative content product is published for consumption, or when a user has paid for the use of non-proxy content items.

By utilizing proxy versions of the user-created content in this manner, systems and methods of some embodiments can utilize less network bandwidth as the online content editor client commands the online content editor server to perform content-related operations on user-created content, and as the online content editor server provides proxy versions of the user-created content for content review and editing purposes. The use of proxy versions of the user-created content also allow the online content editor client to review and edit content without the need for additional computing resources to review user-created content comprising high quality/high definition content.

In addition to using proxy versions of content for online content editing, various embodiments can dynamically determine what and/or how data should be transferred should be transferred between a collaborative online content editor client and a collaborative online content editor server during collaborative content editing operations. Determination of what and how data should be transferred can depend on the type of editing operation invoked and/or the context in which the operation is invoked.

For instance, where a collaborative online content editor client applies a modification to its respective intermediary collaborative content product and the intermediary collaborative content product resides at the client, the client can be configured to send the modified intermediary collaborative content product to the server in parts (e.g., chunks or segments) so that the server, for example, can commence applying the modifications as the parts are received by the server (rather than waiting for the modified intermediary collaborative content arriving in its entirety). In another example, to ensure modifications applied one client can be shared contemporaneously with other collaborative clients, the client can configured to send modifications to the intermediary collaborative content as they are applied locally at the client rather than receiving in a delayed fashion, or the client can be configured to receive from the server updates as updates/modifications from other collaborative clients are applied to the collaborative content product residing on the server.

BRIEF DESCRIPTION OF THE DRAWINGS

FIG. 3 shows a diagram of an example of a multi-source journal content integration client.

DETAILED DESCRIPTION

Multi-Source Journal Content Integration Systems and Methods

This paper describes techniques that those of skill in the art can implement in numerous ways. For instance, those of skill in the art can implement the techniques described herein using a process, an apparatus, a system, a composition of matter, a computer program product embodied on a computer readable storage medium, and/or a processor, such as a processor configured to execute instructions stored on and/or provided by a memory coupled to the processor. Unless stated otherwise, a component such as a processor or a memory described as being configured to perform a task may be implemented as a general component that is configured to perform the task at a given time or a specific component that is manufactured to perform the task. As used herein, the term 'processor' refers to one or more devices, circuits, and/or processing cores configured to process data, such as computer program instructions.

Figure 1:
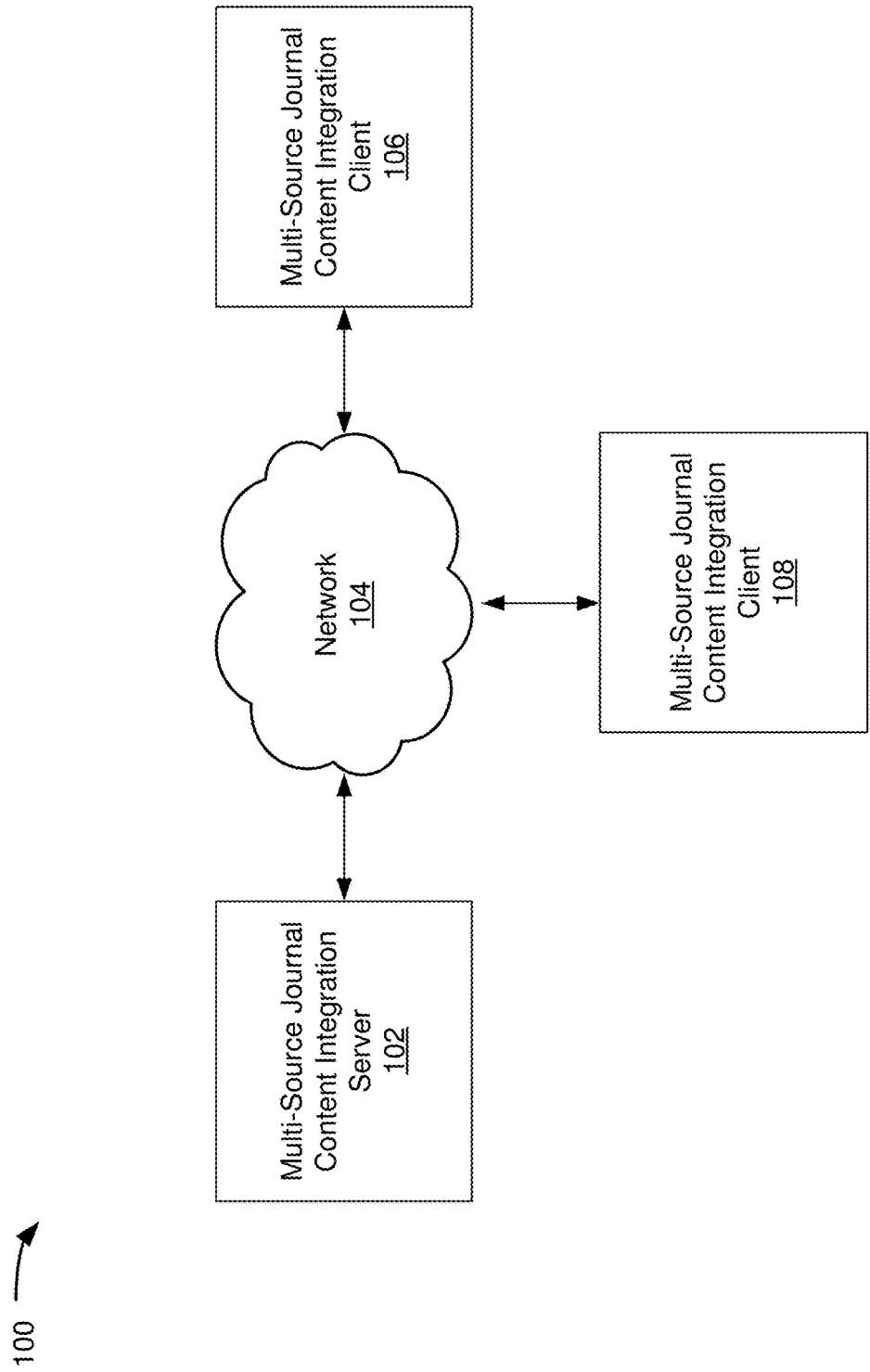
FIG. 1 shows a diagram of an example of a network environment.

FIG. 1 shows a diagram of an example of a network environment 100. In the example of FIG. 1, the network environment 100 can include a multi-source journal content integration server 102, a network 104, a multi-source journal content integration client 106, and a multi-source journal content integration client 108. In the example of FIG. 1, the network 104 connects to each of the multi-source journal content integration server 102, the multi-source journal content integration client 106, and the multi-source journal content integration client 108.

In the example of FIG. 1, the multi-source journal content integration server 102 can provide services to integrate multi-sourced content, such as journal content. As used in this paper, multi-sourced content is audio, video, still pictures, or other content generated by a plurality of content generators. A content generator is typically an individual, but can also be a group, a business entity, or other entity, that creates content using a device like a camera, a video camera, an electronic device (such as a mobile phone or other electronic device), or other device. In some embodiments, the content generator's device can comprise an electronic scanner used to capture a painting or drawing. The content generator's device can also include an electronic device that captures content using an input device (e.g., a computer that captures a user's gestures with a mouse or touch screen). In various embodiments, the content generator can be the entity having creative rights (e.g., an assignee or a licensee) of content. As a plurality of content generators are creating the content integrated by the multi-source journal content integration server 102, the clips being integrated are likely to reflect a variety of perspectives about a given event, place, or occurrence, whether or not the respective content generators share a unified ideology or mission.

As used in this paper, journal content is content related to the investigation or reporting of places, events, occurrences, and other things. Journal content can include, for instance, still images, audio, video, media, and other content related to covering government, business, societal occurrences, cultural events, arts, entertainment, and other topics. Journal content can involve reporting on a variety of levels.

In the example of FIG. 1, the journal content can include translating the actions of policy makers or decision-makers into a format that laypeople and/or the general public can comprehend. More specifically, the journal content can involve chronicling the decisionmaking process underlying an event (such as a Congressional vote on a topic, a nearby protest or rally, or even a dog show) and translating the decisionmaking process into a format that laypeople can understand. Distilling the decisionmaking process of an event can involve capturing important elements of the event to construct a narrative of the processes that went into creating the event. In some embodiments, the journal content can also include creating a forum to facilitate debate, deliberation, and decision on issues of public or private concern. For example, the journal content can include facilitating a multitude of inputs on a given topic and allowing content generators or others to have a degree of editorial control over a subsequent narrative of the topic. Thus, in some embodiments, the journal content can allow content generators or content generators to wholly or partially create a portion of the narrative of the topic. In various embodiments, the journal content can include a report of an event that occurred or is occurring. For example, the journal content can include raw footage in the form of still images, audio, video, or media about an event such as an important political vote, a business's decision, or a protest.

In the example of FIG. 1, the multi-sourced journal content can reflect a variety of observations and perspectives about an event and need not be confined to one editorial or creative vision. For example, multi-sourced journal content of a protest can include raw footage of protest participants who have released a first-person perspective of the protest. However, multi-sourced journal content of the protest need not be confined to a protestor's vision of the event. Rather, the multi-sourced journal content of the protest can include: raw footage from opponents of the protest, footage from police cameras used to capture illegal acts by those nearby, footage from third-party observers (like nearby residents) who are neutral to the protest's message, and professional footage from photojournalists, videographers, and others who wish to sell content to editors. As this example illustrates, the multi-sourced journal content can accommodate a variety of visions about an event. Footage from protestors and protest opponents may be focused on the merits of the message of the protest, while footage from law enforcement may be focused on whether participants were behaving illegally or inappropriately. Footage from third parties may be focused on capturing the effects of the protest on the neighborhood, while footage from professionals may be focused on capturing highly composed attributes of the protest.

In the example of FIG. 1, the multi-source journal content integration server 102 can incorporate a collaborative marketplace to facilitate exchange of specific content clips of the multi-sourced journal content. The collaborative marketplace may or may not be based on a royalty-based system of exchange. In a royalty-based system of exchange, a content generator can receive a royalty for granting permission to use an item of content. In this example, the specific content clips of the multi-sourced journal content can include rights management features, as discussed more thoroughly below. The collaborative marketplace can therefore create incentives for content generators to share and monetize generated content without completely and irreversibly releasing the content into the public domain.

In the example of FIG. 1, the multi-source journal content integration server 102 can include one or more engines. As used in this paper, an "engine" includes a dedicated or shared processor and, typically, firmware or software modules that are executed by the processor. Depending upon implementation-specific or other considerations, an engine can be centralized or its functionality distributed. An engine includes special purpose hardware, firmware, or software embodied in a computer-readable medium for execution by the processor. As used in this paper, a computer-readable medium is intended to include all mediums that are statutory (e.g., in the United States, under 35 U.S.C. § 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

In the example of FIG. 1, the multi-source journal content integration server 102 can include an operating system. An operating system is a set of programs that manage computer hardware resources, and provides common services for application software. The operating system enables an application to run on a computer, whereas only applications that are self-booting can generally run on a computer that does not have an operating system. Operating systems are found in almost any device that includes a computer (e.g., cellular phones, video game consoles, web servers, etc.). Examples of popular modern operating systems are Linux, Android, iOS, Mac OS X, and Microsoft Windows®. Embedded operating systems are designed to operate on small machines like PDAs with less autonomy (Windows CE and Minix 3 are some examples of embedded operating systems). Operating systems can be distributed, which makes a group of independent computers act in some respects like a single computer. Operating systems often include a kernel, which controls low-level processes that most users cannot see (e.g., how memory is read and written, the order in which processes are executed, how information is received and sent by I/O devices, and devices how to interpret information received from networks). Operating systems often include a user interface that interacts with a user directly to enable control and use of programs. The user interface can be graphical with icons and a desktop or textual with a command line. Application programming interfaces (APIs) provide services and code libraries. Which features are considered part of the operating system is defined differently in various operating systems, but all of the components are treated as part of the operating system in this paper for illustrative convenience.

In the example of FIG. 1, the multi-source journal content integration server 102 can include one or more datastores that hold content, editing layers, and/or other data. A datastore can be implemented, for example, as software embodied in a physical computer-readable medium on a general- or specific-purpose machine, in firmware, in hardware, in a combination thereof, or in an applicable known or convenient device or system. Datastores in this paper are intended to include any organization of data, including tables, comma-separated values (CSV) files, traditional databases (e.g., SQL), or other applicable known or convenient organizational formats. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure.

In the example of FIG. 1, the multi-source journal content integration server 102 can be compatible with a cloud based computing system. As used in this paper, a cloud based computing system is a system that provides computing resources, software, and/or information to client devices by maintaining centralized services and resources that the client devices can access over a communication interface, such as a network. The cloud based computing system can involve a subscription for services or use a utility pricing model. Users can access the protocols of the cloud based computing system through a web browser or other container application located on their client device.

In the example of FIG. 1, one or more of the engines in the multi-source journal content integration server 102 can include cloud-based engines. A cloud-based engine is an engine that can run applications and/or functionalities using a cloud-based computing system. All or portions of the applications and/or functionalities can be distributed across multiple computing devices, and need not be restricted to only one computing device. In some embodiments, the cloud-based engines can execute functionalities and/or modules that end users access through a web browser or container application without having the functionalities and/or modules installed locally on the end-users' computing devices. In the example of FIG. 1, one or more of the datastores in the multi-source journal content integration server 102 can be cloud-based datastores. A cloud-based datastore is a datastore compatible with a cloud-based computing system.

For instance, the multi-source journal content integration server 102 can host a website providing multi-sourced journal content integration and/or editing services. The website can access engines and datastores that provide a user with tools to edit the content online. The engines in the multi-source journal content integration server 102 can execute on the multi-source journal content integration server 102 and can provide a cloud-based interface for display on a host application, such as a web browser on one or more of the multi-sourced journal content integration client 106 and the multi-sourced journal content integration client 108.

In various embodiments, the datastores in the multi-source journal content integration server 102 can include datastores, distributed across multiple computing devices or otherwise, that provide content, editing layers, and/or other data that applications and/or end users can access through a web browser or container application without having the functionalities and/or modules installed locally on the end-users' computing devices.

In some embodiments, an end-user need not purchase a proprietary operating system or install expensive journal content integration and/or editing software, as long as the user has access to a web browser or container application that can access the engines and datastores in the multi-source journal content integration server 102.

A user also need not purchase expensive and high-performance computing equipment or memory. Beneficially, a user need not purchase extensive content editing packages, such as high-quality editing-effects packages as editing-effects packages would be stored and executed in the multi-source journal content integration server 102. Users need not worry about software becoming obsolete because a remote online application can be used to run any executable file, regardless of whether the file is currently executable on the user's device; legacy platforms can run on any device. Accordingly, one or more of the engines in the multi-source journal content integration server 102 can support applications and/or functionalities that end-users can access through a container (such as a web browser) without local installation.

In the example of FIG. 1, the network 104 can include a computer network. The network 104 can include communication channels to connect server resources and information in the multi-source journal content integration server 102 with client resources and information in the multi-source journal content integration clients 106 and 108. In the example of FIG. 1, the network 104 can be implemented as a personal area network (PAN), a local area network (LAN), a home network, a storage area network (SAN), a metropolitan area network (MAN), an enterprise network such as an enterprise private network, a virtual network such as a virtual private network (VPN), or other network. One network of particular interest for an online application service is the World Wide Web ("the Web"), which is one of the services running on the Internet. The Web is a system of interlinked hypertext documents accessed via the Internet. With a web browser, one can view web pages that can contain text, images, videos, and other multimedia and navigate between the web pages via hyperlinks. The network 104 can serve to connect people located around a common area, such as a school, workplace, or neighborhood. The network 104 can also connect people belonging to a common organization, such as a workplace. Portions of the network 104 can be secure and other portions of the network 104 need not be secure.

In the example of FIG. 1, the network 104 can use a variety of physical or other media to connect the multi-source journal content integration server 102 with the multi-source journal content integration clients 106 and 108. For instance, the network 104 can connect the multi-source journal content integration server 102 with one or more of the multi-source journal content integration clients 106 and 108 using some combination of wired technologies, such as twisted pair wire cabling, coaxial cabling, optical fiber cabling, or other cabling.

In the example of FIG. 1, the network 104 can also use some combination of wireless technologies. Wireless networks will typically include an internetworking unit (IWU) that interconnects wireless devices on the relevant one of the wireless networks with another network, such as a wired LAN. The IWU is sometimes referred to as a wireless access point (WAP). In the IEEE 802.11 standard, a WAP is also defined as a station. Thus, a station can be a non-WAP station or a WAP station. In a cellular network, the WAP is often referred to as a base station. Wireless networks can be implemented using any applicable technology, which can differ by network type or in other ways. The wireless networks can be of any appropriate size (e.g., metropolitan area network (MAN), personal area network (PAN), etc.). Broadband wireless MANs may or may not be compliant with IEEE 802.16, which is incorporated by reference. Wireless PANs may or may not be compliant with IEEE 802.15, which is incorporated by reference. The network 104 can be identifiable by network type (e.g., 2G, 3G, Wi-Fi), service provider, WAP/base station identifier (e.g., Wi-Fi SSID, base station and sector ID), geographic location, or other identification criteria. The wireless networks may or may not be coupled together via an intermediate network. The intermediate network can include practically any type of communications network, such as, by way of example but not limitation, the Internet, a public switched telephone network (PSTN), or an infrastructure network (e.g., private LAN). The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (the web).

In the example of FIG. 1, one or more of the multi-source journal content integration clients 106 and 108 can include one or more computers, each of which can, in general, have an operating system and include datastores and engines. In this example, one or more of the multi-source journal content integration clients 106 and 108 can execute variable-layer content editing services inside a host application (i.e., can execute a browser plug-in in a web browser). The browser plug-in can provide an interface such as a graphical user interface (GUI) for a user to access the content editing services on the multi-source journal content integration server 102. The browser plug-in can include a GUI to display content and layers on the datastores in the multi-source journal content integration server 102. For instance, the browser plug-in can have display capabilities like the capabilities provided by proprietary commercially available plug-ins like Adobe® Flash Player, QuickTime®, and Microsoft Silverlight®. The browser plug-in can also include an interface to execute functionalities on the engines in the multi-source journal content integration server 102.

In the example of FIG. 1, a device on which the multi-source journal content integration clients 106 and 108 is implemented can be implemented as a station. A station, as used herein, may be referred to as a device with a media access control (MAC) address and a physical layer (PHY) interface to the wireless medium that comply with, e.g., the IEEE 802.11 standard. A station can be described as "IEEE 802.11-compliant" when compliance with the IEEE 802.11 standard is intended to be explicit. (I.e., a device acts as described in at least a portion of the IEEE 802.11 standard.) One of ordinary skill in the relevant art would understand what the IEEE 802.11 standard comprises today and that the IEEE 802.11 standard can change over time, and would be expected to apply techniques described in this paper in compliance with future versions of the IEEE 802.11 standard if an applicable change is made. IEEE Std 802.11™-2007 (Revision of IEEE Std 802.11-1999) is incorporated by reference. IEEE 802.11k-2008, IEEE 802.11n-2009, IEEE 802.11p-2010, IEEE 802.11r-2008, IEEE 802.11w-2009, and IEEE 802.11y-2008 are also incorporated by reference.

In alternative embodiments, one or more wireless devices may comply with some other standard or no standard at all, and may have different interfaces to a wireless or other medium. It should be noted that not all standards refer to wireless devices as "stations," but where the term is used in this paper, it should be understood that an analogous unit will be present on all applicable wireless networks. Thus, use of the term "station" should not be construed as limiting the scope of an embodiment that describes wireless devices as stations to a standard that explicitly uses the term, unless such a limitation is appropriate in the context of the discussion.

Figure 2:
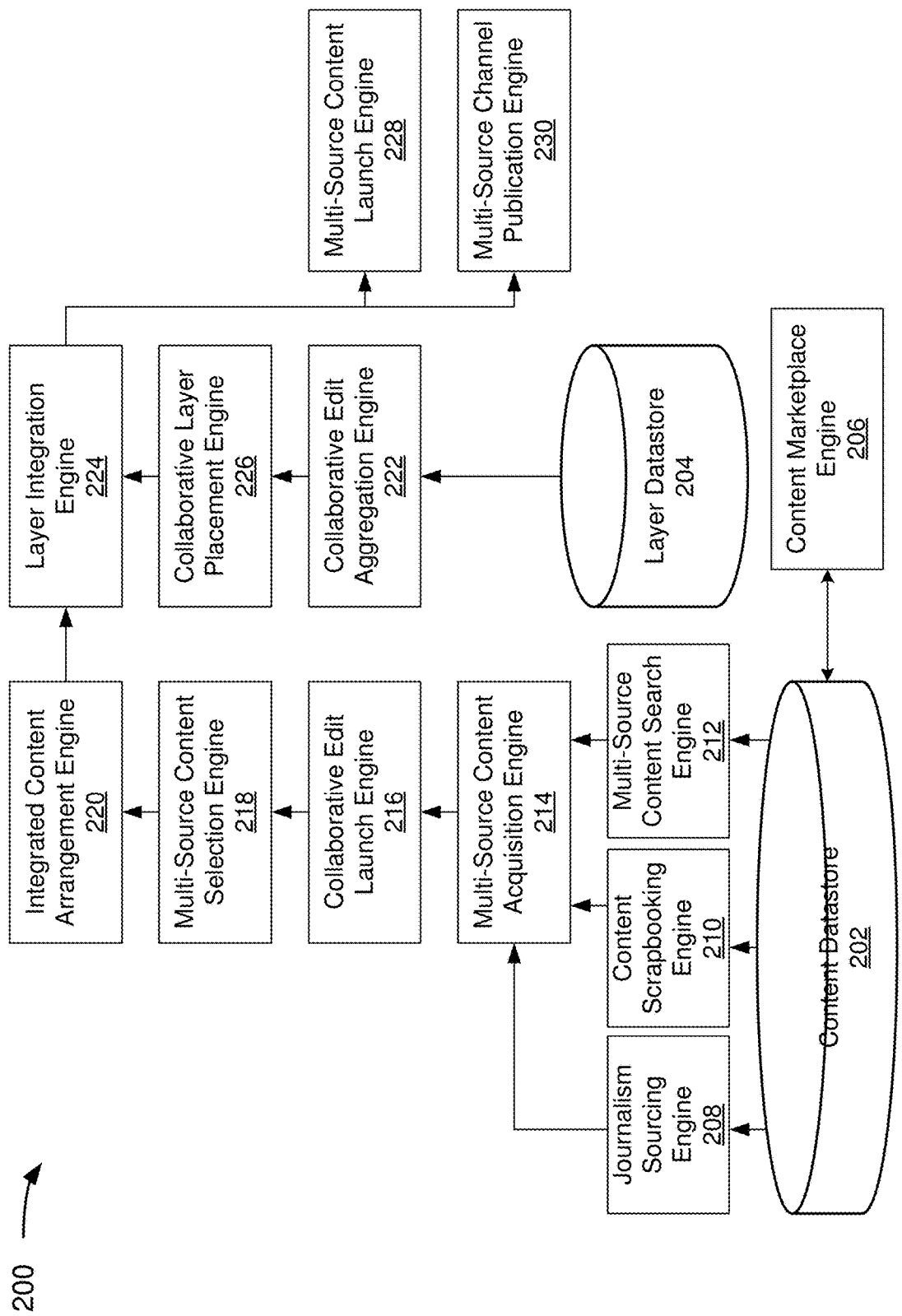
FIG. 2 shows a diagram of an example of a multi-source journal content integration server.

FIG. 2 shows an example of a multi-source journal content integration server 200. In the example of FIG. 2, the multi-source journal content integration server 200 can include one or more of: a content datastore 202, a layer datastore 204, a content marketplace engine 206, a journalism sourcing engine 208, a content scrapbooking engine 210, a multi-source content search engine 212, a multi-source content acquisition engine 214, a collaborative edit launch engine 216, a multi-source content selection engine 218, an integrated content arrangement engine 220, a collaborative edit aggregation engine 222, a layer integration engine 224, a collaborative layer placement engine 226, a multi-source content launch engine 228, and a multi-source channel publication engine 230.

In the example of FIG. 2, the content marketplace engine 206, the journalism sourcing engine 208, the content scrapbooking engine 210, and the multi-source content search engine 212 can each connect to the content datastore 202. The multi-source content acquisition engine 214 can connect to each of the journalism sourcing engine 208, the content scrapbooking engine 210, and the multi-source content search engine 212. The collaborative edit launch engine 216 can connect to the multi-source content acquisition engine 214. The multi-source content selection engine 218 can connect to the collaborative edit launch engine 216. The integrated content arrangement engine 220 can connect to the multi-source content selection engine 218. In the example of FIG. 2, the layer datastore 204 can connect to the collaborative edit aggregation engine 224. The layer integration engine 224 can connect to each of the integrated content arrangement engine 220 and the collaborative layer placement engine 226. The collaborative layer placement engine 226 can connect to the collaborative edit aggregation engine 224. Further, in the example of FIG. 2, each of the multi-source content launch engine 228, and the multi-source channel publication engine 230 can connect to the layer integration engine 222.

In the example of FIG. 2, the content datastore 202 stores content such as audio, still images, video, media, or other content. In some embodiments, the content in the content datastore 202 can be stored in the form of "clips," each comprising a discrete file associated with a specific scene, sound, or image that was captured. One or more of the clips can relate to the same scene, but in various embodiments, the clips can relate to different scenes or different perspectives of one or more scenes. In this example, the content datastore 202 resides within the multi-source content journal integration server 200. However, in some embodiments, the content datastore 202 need not be within the multi-source content journal integration server 200 and may connect to the multi-source content journal integration server 200 by a communication interface such as a network connection. In various embodiments, the content datastore 202 can also be distributed across multiple devices. In some embodiments, the content datastore 202 can reside in cloud-based storage. Advantageously, distributing the content datastore 202 across multiple devices can accommodate a large amount of storage and give the multi-source content journal integration server 200 access to a wide variety of content from a multitude of sources.

In the example of FIG. 2, the content in the content datastore 202 can be "user-generated." As used in this paper "user generated" content refers to content generated by users of an account associated with a service used to manage the content datastore 202. The content can also be generated by a plurality of sources. For instance, the content in the content datastore 202 can be generated by a plurality of computers, mobile phones, cameras, camcorders, scanners, and digital devices.

In the example of FIG. 2, the layer datastore 204 stores editing layers. As used in this paper, an "editing layer" is an element of content that can be superimposed onto another item of content. An editing layer can include one or more of an image, an item of audio, an effect, an item of video, animation, or an interactivity item that can accept user input. In this example, the layer datastore 204 resides within the multi-source content journal integration server 200. However, in some embodiments, the layer datastore 204 need not be within the multi-source content journal integration server 200 and may connect to the multi-source content journal integration server 200 by a communication interface such as a network connection. In various embodiments, the layer datastore 204 can also be distributed across multiple devices. In some embodiments, the layer datastore 204 can reside in cloud-based storage. Advantageously, distributing the layer datastore 204 across multiple devices can provide a user with a nearly unlimited number of editing layers to apply to content. Further, distributing the layer datastore 204 across multiple devices can also provide a user with proprietary or user-generated editing layers that would otherwise be unavailable with a locally installed standalone editing package.

In the example of FIG. 2, the content marketplace engine 206, in operation, can facilitate user-based exchange of user-generated journal content. In this example, the content marketplace engine 206 can index specific items of content in the content datastore 202 by owner. As used herein, an "owner" of content can be a person or entity that owns the rights to reproduce and/or publish the content. In some embodiments, the owner of items of content in the content datastore 202 can be the generator of the items of content. The owner of the items of content in the datastore 202 can also be an assignee, an exclusive or a non-exclusive licensee, or other entity with rights to the items of content. Consistent with this example, the content marketplace engine 206 can associate a price the items of content in the content datastore 202; the price may or may not be set by the owner of the items of content. In some embodiments, the content marketplace engine 206 can establish an offer process, which allows an entity wishing to use an item of content an opportunity to offer a price for the item of content. The price can comprise a monetary value but can also comprise, in various embodiments, an offer to license an item of content owned by the offeree. In this example, the content marketplace engine 206 can also include an acceptance process to allow the owner of the items of content to accept the offer to use for the item of content. Further, in this example, if the offer is accepted, the content marketplace engine 206 can facilitate the transfer of the item of content to the offeree for the offeree's use. In various embodiments, the content marketplace engine 206 can implement rights management processes so that the offeree does not use the items of content beyond the scope of what the owner of the item of content desires.

In the example of FIG. 2, the journalism sourcing engine 208, in operation, can provide to the multi-source content acquisition engine 214 user-generated coverage of an event obtained from one or more citizen journalists. As used in this paper, a "citizen journalist" is an entity that seeks to capture an aspect of the investigation or reporting of a place, an event, an occurrence, or thing. In a sense, a citizen journalist is a generator of journal content and can be armed with, for instance, a camera, a microphone, a video camera, or other device to capture an attribute of journalistic investigation or reporting. In this example, the journalism sourcing engine 208 can receive search parameters focused on the subject matter of journalism. For instance, the journalism sourcing engine 208 can receive keywords about "war," "protests," "Congressional action," "federal agency decisions," "court opinions," "local politics," "news," or can simply receive a zip code or location identifier to use to mine the content datastore 202 for journalism related content. The journalism sourcing engine 208 can also keep an account of the generator of specific clips to ensure that the journalism sourcing engine 208 can obtain content from different content generators.

In the example of FIG. 2, the journalism sourcing engine 208 can provide to the multi-source content acquisition engine 214 a plurality of content clips relating to a single event. For instance, the journalism sourcing engine 208 can provide to the multi-source content acquisition engine 214 multiple images, multiple audio recordings, multiple video or media clips, or some combination thereof, relating to an event such as a protest. In various embodiments, distinct items of content are generated by distinct citizen journalists. Thus, the journalism sourcing engine 208 can provide to the multi-source content acquisition engine 214 first user-generated content of an event obtained from a first citizen journalist as well as second user-generated coverage of the event obtained from a second citizen journalist. Accordingly, the journalism sourcing engine 208 can provide the multi-source content acquisition engine 214 with multiple perspectives of a single event and can accommodate the journalistic capture of the event by amateurs having various perspectives of the event.

In the example of FIG. 2, the content scrapbooking engine 210, in operation, can provide to the multi-source content acquisition engine 214 user-generated social history content. As used in this paper, "social history" content is content associated with a person's familial or community history, lineage, or tradition in a region or during a period of time. In this example, the content scrapbooking engine 210 can receive search parameters focused on the subject matter of social history. For instance, the content scrapbooking engine 210 can receive keywords about "community," "tradition," "births," "obituaries," "rites of passage," "religion," and other keywords. The content scrapbooking engine 210 can also keep an account of the generator of specific clips to ensure that the content scrapbooking engine 210 can obtain content from different content generators.

In the example of FIG. 2, the content scrapbooking engine 210 can provide to the multi-source content acquisition engine 214 a plurality of content clips relating to a single event. For instance, the content scrapbooking engine 210 can provide to the multi-source content acquisition engine 214 multiple images, multiple audio recordings, multiple video or media clips, or some combination thereof, relating to an event such as a Bar Mitzvah. In various embodiments, distinct items of content are generated by distinct content generators. Accordingly, the content scrapbooking engine 210 can provide the multi-source content acquisition engine 214 with multiple perspectives of a single event and can accommodate the capture of the event by amateurs having various perspectives of the event.

In the example of FIG. 2, the multi-source content search engine 212, in operation, executes search queries and retrieves journal content from the content datastore 202. In some embodiments, the multi-source content search engine 212 receives the search queries from the multi-source content acquisition engine 214 or other parts of the system. The multi-source content search engine 212 can base the search queries on one or more search classes. In some embodiments, the search classes can include searches for the subject of journal content or the subject class of journal content. For instance, the multi-source content search engine 212 can query the content datastore 202 for journal content relating to a final decision of a government agency, a local bake sale underway, an event occurring at a financial exchange or a business, or a local auction.

In the example of FIG. 2, the search classes can include searches for specific parameters of a scene that is requested. For instance, the multi-source content search engine 212 can query the content datastore 202 for journal content captured at a particular time of day or having specific color parameters (e.g., blue and yellow hues). In some embodiments, the multi-source content search engine 212 can query the content datastore 202 for scenes shot from a particular vantage point, such as a birds'-eye view.

In the example of FIG. 2, the search classes can include searches for specific content generators or specific groups or classes of content generators. For instance, the multi-source content search engine 212 can query the content datastore 202 for journal content captured by content generators having particular demographic characteristics (e.g., between the ages of 18-25 and male), content generators having particular associations (e.g., who are part of specific friend networks or geographically distributed networks), content generators who share particular general political views (e.g., liberal views) or particular political views on a specific topic (e.g., are against abortion), and content generators of particular socio-economic statuses. The multi-source content search engine 212 can also query the content datastore 202 for combinations of groups or classes of content generators.

In this example, the search classes can include searches for specific journal content parameters. For instance, the multi-source content search engine 212 can limit search queries to images, to audio clips, to video clips, and to other forms of media. The multi-source content search engine 212 can also limit search queries to files of specific length or size. Based on the executed search queries to the content datastore 202, the multi-source content search engine 212 can provide relevant content to the multi-source content acquisition engine 214.

In the example of FIG. 2, the multi-source content acquisition engine 214, in operation, provides a request to the multi-source content search engine 212 search the content datastore 202 for subject-specific content. In some embodiments, the multi-source content acquisition engine 214 can provide a character string corresponding to one or more of search classes, specific scene parameters, specific content generators, specific journal content parameters, and other search parameters. The multi-source content acquisition engine 214 can, based on the executed search, receive a set of relevant content from the multi-source content search engine 212. In various embodiments, the multi-source content acquisition engine 214 can also execute search queries using one or more of the journalism sourcing engine 208 and/or the content scrapbooking engine 210.

In the example of FIG. 2, the multi-source content acquisition engine 214, in operation, provides an instruction to launch an editor window to display a set of selectable content from user-generated content generated by a plurality of sources and stored in the content datastore 202. In the example of FIG. 2, the instruction from the multi-source content acquisition engine 214 can identify a particular client device that launches the editor window. In some embodiments, the instruction can contain a network address such as an Internet Protocol (IP) or other address of the client. The instruction can also contain a device identifier such a Media Access Card (MAC) address of the client. Using the request, the multi-source content acquisition engine 214 can identify a client using destination/network identifiers to launch an editor window on the client.

In the example of FIG. 2, the instruction from the multi-source content acquisition engine 214 can also identify parameters of a client host application. The instruction can identify the operating system on the client and can help the multi-source content acquisition engine 214 determine whether to support the client operating system. The request can also identify the type and version of a host application, such as a web browser, on the client. The request can further identify the screen resolution, processor speed, memory, and network speed of the client device. Using these and other exemplary parameters, the multi-source content acquisition engine 214 can determine whether to support the client's specific host application. The multi-source content acquisition engine 214 can also use the request to supply an edit window with default parameters based on any of the OS or the host application parameters in the request. The multi-source content acquisition engine 214 can further determine whether to recommend an upgraded operating system or host application to the client.

In the example of FIG. 2, the instruction from the multi-source content acquisition engine 214 help perform a "smart-bandwidth" determination. Using the client network speed, the multi-source content acquisition engine 214 can calculate an optimal resolution of the content to provide for editing. For instance, if the request identifies a client connected to a Digital Signal 3 (T3) connection or other relatively fast Internet connection, the multi-source content acquisition engine 214 can determine it is desirable to provide relatively high quality media content (e.g., high definition (HD) media content) for editing. On the other hand, if the request identifies a client being connected to a dial-up modem, the multi-source content acquisition engine 214 can determine it is desirable to provide relatively low quality media content for editing.

In the example of FIG. 2, the instruction from the multi-source content acquisition engine 214 can include user account parameters. Further, in some embodiments, the multi-source content acquisition engine 214 can direct the edit window to the device identified for display. The multi-source content acquisition engine 214 can characterize the edit window with a resolution and other parameters that are supported by the client device's operating system and host application. For instance, the multi-source content acquisition engine 214 can access application programming interfaces or other modules on the client to load an edit window as a browser plug-in in a web browser running on the client. The multi-source content acquisition engine 214 can also use the "smart-bandwidth" determination to limit the maximum resolution of the edit window. As a result, the multi-source content acquisition engine 214 can launch a highly usable, easily portable content edit window while installing no new applications on the client.

In the example of FIG. 2, the multi-source content acquisition engine 214 can instruct the launched editor window to display a set of selectable content from the relevant content that was retrieved from the content datastore 202. The instruction to display the set of selectable content can be based, wholly or in part, on the search parameters that the multi-source content acquisition engine 214 provided to the multi-source content search engine 212. In this example, the instruction to display can transfer to a client device an icon associated with each item of selectable content. The multi-source content acquisition engine 214 can adjust the resolution of the transferred icons in order to accommodate the bandwidth of the communication channel between the multi-source content acquisition engine 214 and the client. For instance, if it is determined that the client can handle higher quality media content, the multi-source content acquisition engine 214 can provide higher resolution icons corresponding to the selectable content. Conversely, if the client can only handle lower quality media content, the multi-source content acquisition engine 214 can provide lower resolution icons corresponding to the selectable content. As a result, instructions from the multi-source content acquisition engine 214 can direct the editor window on the client to display a set of user-generated content generated by a plurality of sources. Advantageously, in some embodiments, the selectable content can be crowdsourced journal content.

In the example of FIG. 2, the multi-source content acquisition engine 214 can provide the instruction to launch the editor window indirectly to the client through the collaborative edit launch engine 216. One of ordinary skill in the art will appreciate that the multi-source content acquisition engine 214 can also provide the instruction to launch the editor window directly to the client.

In the example of FIG. 2, the collaborative edit launch engine 216, in operation, can receive the instruction to launch the editor window from the multi-source content acquisition engine 214. In this example, the collaborative edit launch engine 216 can translate the instruction from the multi-source content acquisition engine 214 into commands to launch multiple editing windows on multiple clients, of which a first client and second client are illustrated herein. For instance, the collaborative edit launch engine 216 can launch a first editor window on a first edit client and a second editor window on a second edit client based on the instruction to launch the editor window. More specifically, the collaborative edit launch engine 216 can identify a first client device and edit window parameters for an edit window to be displayed on the first client device. The collaborative edit launch engine 216 can also identify a second client device and edit window parameters for an edit window to be displayed on the second client device. In some embodiments, the collaborative edit launch engine 216 can provide network addresses and/or device identifiers of each of the first and second clients.

In the example of FIG. 2, the collaborative edit launch engine 216 can identify parameters of client host applications running on each of the first client and the second client. For instance, the collaborative edit launch engine 216 can identify the operating systems of the first and second clients, the type/version of the host applications on the first and second clients, and the device parameters (e.g., the screen resolution, processor speed, memory, and network speed) of the first and second clients, In some embodiments, the collaborative edit launch engine 216 can supply to the first and second clients respective edit windows with default parameters based on any of the OS or the host application parameters supplied. Further, the collaborative edit launch engine 216 can determine whether to recommend an upgraded operating system or host application to the first client or the second client. In various embodiments, the collaborative edit launch engine 216 can perform a "smart-bandwidth" determination on each of the first client and the second client and can determine the quality of content to be delivered to each of the first client and the second client for editing. Further, the collaborative edit launch engine 216 can also employ user account parameters when directing the first edit client and the second edit client to launch respective editing windows.

In the example of FIG. 2, the collaborative edit launch engine 216 can instruct one or more of the first editing window and the second editing window to display a set of selectable content from the relevant content that was retrieved from the content datastore 202. The content displayed on the first editing window may or may not be the same as the content displayed on the second editing window. The instruction to display the set of selectable content can be based, wholly or in part, on the search parameters that the multi-source content acquisition engine 214 provided to the multi-source content search engine 212. In this example, the instruction to display can transfer to one or more of the first client device and the second client device an icon associated with each item of selectable content. The collaborative edit launch engine 216 can adjust the resolution of the transferred icons in one or more of the first edit client and the second edit client in order to accommodate the bandwidth of the communication channel between the multi-source content acquisition engine 214 and these edit clients. Accordingly, the collaborative edit launch engine 216 can facilitate collaborative editing of content across multiple devices and clients. Advantageously, in some embodiments, the selectable content can be crowdsourced journal content.

In the example of FIG. 2, the multi-source content selection engine 218, in operation, can identify a set of selected content from the set of selectable content. In some embodiments, the multi-source content selection engine 218 can receive a selection of content from a host application on the one or more clients configured to display selectable content from the multi-source content acquisition engine 214 (or the collaborative edit launch engine 216). More specifically, user interface on the host applications can capture a user's identification of content that he or she desires to edit and/or publish. Based on the user's identified content, the multi-source content selection engine 218 can select a subset of the selectable content that was provided to the one or more clients. As used in this paper, the subset of identified content can be referred to as the "selected content." Once the set of selected content has been identified, the multi-source content selection engine 218 can provide the set of selected content to the integrated content arrangement engine 220.

In the example of FIG. 2, the multi-source content selection engine 218 can receive timeline information from the one or more clients. As used in this paper, timeline information comprises instructions on how the specific items of selected content are to be arranged in a sequence. In some embodiments, the timeline information can comprise an ordered list of the specific items of selected content. However, the timeline information can also comprise the relative lengths of items of selected content or other sequencing information. In the example of FIG. 2, the multi-source content selection engine 218 can transmit the timeline information to the integrated content arrangement engine 220.

In the example of FIG. 2, the integrated content arrangement engine 220, in operation, arranges the set of selected content into a multi-sourced journal content sequence. As used in this paper, a journal content sequence comprises items of journal content arranged in an sequence, an order, or a series. A multi-sourced journal content sequence comprises a journal content sequence made up of items of journal content taken from a plurality of sources, i.e., generated from a plurality of content generators. In this example, the integrated content arrangement engine 220 can receive a set of selected content from the multi-source content selection engine 218. Based on the timeline information from the multi-source content selection engine 218, the integrated content arrangement engine 220 can place items in the set of selected content (received from the multi-source content selection engine 218) into a multi-sourced journal content sequence. In some embodiments, the integrated content arrangement engine 220 can also add default transition effects, such as an automatic transition, between specific items of selected content to ensure attributes such as smooth transitions.

In the example of FIG. 2, the layer integration engine 222, in operation, applies an editing layer from the layer datastore 204 to a portion of the multi-sourced journal content sequence. As discussed in this paper, an "editing layer" is an element of content that can be superimposed onto another item of content. An editing layer can include one or more of an image, an item of audio, an effect, an item of video, animation, or an interactivity item that can accept user input. In some embodiments, the layer integration engine 222 can apply the editing layer to the multi-sourced journal content sequence based on an instruction to superimpose the editing layer. An instruction to superimpose an editing layer can include an identifier of specific editing layers and layer datastore 204 access parameters (such as layer datastore 204 usernames and passwords). In the illustrated example, the identifier of the editing layer can identify the editing layer by name, by the editing layer address in the layer datastore 204, or by the editing layer relationship to other layers in the layer datastore 204. The instruction to superimpose the editing layer can also include one or more API calls that obtain the editing layer from the layer datastore 204.

In the example of FIG. 2, the instruction to superimpose can include directing the placement of the editing layer over at least a portion of the multi-sourced journal content sequence. The instruction to superimpose can therefore include an instruction to assist in editing the multi-sourced journal content sequence.

In the example of FIG. 2, the instruction to superimpose the editing layer can also include performing one or more API calls to the editor window in the client. The instruction to superimpose the editing layer could also reference a portion of the timeline of the multi-sourced journal content sequence for which the editing layer is to be applied. For instance, the instruction could include superimposing textual credits for ten seconds to start the multi-sourced journal content sequence. The instruction to superimpose could also identify a visual portion of the multi-sourced journal content sequence for which the editing layer is to be applied. For example, the instruction to superimpose could include placing textual credits on the bottom left-hand quadrant of the multi-sourced journal content sequence.

In the example of FIG. 2, the editing layers could include video layers. Video layers are video clips that can be added to portions of the multi-sourced journal content sequence. For instance, a film editor may wish to add video to a corner of the multi-sourced journal content sequence so that the video appears integrated into the multi-sourced journal content sequence. The editing layers could include transition layers. Transition layers are video clips or images used to transition between scenes in the multi-sourced journal content sequence. For instance, a film editor may wish to recreate fading or wiping effects commonly seen in films. The editing layers could include sound layers such as audio effects or soundtracks for parts of the multi-sourced journal content sequence. The editing layers could further include graphical layers. Graphical layers are animated layers that film editors can use to create graphical effects for parts of the multi-sourced journal content sequence. Moreover, the editing layers could include user-specific media layers, which can correspond to video, audio, animated, and other content created or uploaded by a film editor or other users. FIGS. 9-12 show the video layers, transition layers, sound layers, graphical layers, and user-specific media layers.

In the example of FIG. 2, the instruction to superimpose the editing layer can associate the editing layer with a destination edit layer classification on the multi-sourced journal content sequence. Thus, based on an instruction, the layer integration engine 222 can add an editing layer to any of the destination edit layer classifications associated with the multi-sourced journal content sequence.

In the example of FIG. 2, the instruction to superimpose the editing layer can control effects relating to each editing layer. The instruction to superimpose the editing layer can control, for instance, whether a specific editing layer is to fade in or out. The instruction to superimpose the editing layer can also control the transparency and other attributes of a specific editing layer.

To apply the editing layer onto the existing layers of the multi-sourced journal content sequence, the layer integration engine 222 modifies the multi-sourced journal content sequence to include the material from the editing layer. For instance, if the editing layer was a video layer, the multi-sourced journal content sequence would include the video material from the editing layer. The layer integration engine 222 can similarly add audio, graphics, and other effects to the multi-sourced journal content sequence.

In the example of FIG. 2, the collaborative edit aggregation engine 224, in operation, can provide to the layer aggregation engine 222 a plurality of instructions. In some embodiments, the collaborative edit aggregation engine 224 can receive the instructions from a plurality of clients that are remote to the multi-source journal content integration server 200. More specifically, a first remote source can provide to the collaborative edit aggregation engine 224 a first instruction to apply a first editing layer from the layer datastore 204 to a portion of the multi-sourced journal content sequence. Further, a second remote source can provide to the collaborative edit aggregation engine 224 a second instruction to apply a second editing layer from the layer datastore 204 to the same or another portion of the multi-sourced journal content sequence. The collaborative edit aggregation engine 224 can provide the first and second instructions to the collaborative layer placement engine 226.

In the example of FIG. 2, the collaborative layer placement engine 226, in operation, can provide to the layer integration engine 222 a plurality of editing layers from a plurality of editing windows. In some embodiments, the collaborative layer placement engine 226 can provide to the layer integration engine 222 a first editing layer received from the first editor window and a second editing layer received from the second editor window. The collaborative layer placement engine 226 can receive the first and second editing layers from the collaborative edit aggregation engine 224. The collaborative layer placement engine 226 can instruct the layer integration engine 222 can add an editing layer to any of the destination edit layer classifications associated with the multi-sourced journal content sequence.

To illustrate the foregoing examples further, suppose a first remote client comprises a computer that is at a location remote from the multi-source journal content integration server 200, and a second remote client comprises a mobile phone with Internet capabilities that is at a location remote from both the multi-source journal content integration server 200 and the first remote client. Consistent with the example of FIG. 2, the first remote client (i.e., the computer) can provide an instruction to the collaborative edit aggregation engine 224 to apply an editing layer (e.g., placing a clip of video in a corner) for the first ten seconds of the multi-sourced journal content sequence. In this example, the second remote client (i.e., the mobile phone) can provide an instruction to the collaborative edit aggregation engine 224 to apply another layer (e.g., textual credits for an introduction) for the first ten seconds of the multi-sourced journal content sequence. In this example, the collaborative edit aggregation engine 224 can instruct the collaborative layer placement engine 226 to apply both the video from the first remote source and the text from the second remote source to the specified portion of the multi-sourced journal content sequence. The collaborative layer placement engine 226 can translate these commands (from different remote sources) into a format that the layer integration engine 222 can understand. In this example, the layer integration engine 222 can superimpose both the video and the text onto the specified portion of the multi-sourced journal content sequence. Accordingly, both the first remote client and the second remote client are able to collaboratively edit the multi-sourced journal content sequence even though they are remote to one another and remote to the multi-source journal content integration server 200.

In the example of FIG. 2, the multi-source content launch engine 228, in operation, can provide an instruction to display an integrated multi-sourced journal content sequence that includes the multi-sourced journal content sequence and the editing layer in the editor window. In some embodiments, the multi-source content launch engine 228 can interface with the editor window and provide an integrated multi-sourced journal content sequence which includes the original set of content and applied editing layers in the editor window. The instruction to display the integrated multi-sourced journal content sequence could comprise an instruction to begin streaming the integrated multi-sourced journal content sequence or otherwise playing the integrated multi-sourced journal content sequence in the host application. The multi-source content launch engine 228 can limit the viewing quality of the integrated multi-sourced journal content sequence until the multi-source content launch engine 228 has determined that the entity editing the integrated multi-sourced journal content sequence has creative rights to the multi-sourced journal content sequence and the editing layers applied thereon. In some embodiments, the multi-source content launch engine 228 can apply a watermark or other seal to render the integrated multi-sourced journal content sequence unpublishable until the multi-source content launch engine 228 has determined that the entity editing the integrated multi-sourced journal content sequence has creative rights to the multi-sourced journal content sequence and the editing layers applied thereon. Consequently, the multi-source content launch engine 228 can allow the one or more client applications to display the integrated multi-sourced journal content sequence while collaboratively editing from a plurality of remote sources.

In the example of FIG. 2, the multi-source channel publication engine 230, in operation, can create a multi-sourced channel comprising the integrated multi-sourced journal content sequence. In some embodiments, the multi-source channel publication engine 230 can interface with one or more network- or Internet-based streaming media accounts. For example, the multi-source channel publication engine 230 can login to an Internet-based streaming media account (such as YouTube) using a user name and password associated with the account. The multi-source channel publication engine 230 can further access one or more APIs of the streaming media account to publish the integrated multi-sourced journal content sequence to the network- or Internet-based streaming media account. In various embodiments, the multi-source channel publication engine 230 can translate the integrated multi-sourced journal content sequence into a digital television format and can publish the integrated multi-sourced journal content sequence using a digital broadcast mechanism. The multi-source channel publication engine 230 can limit the publication of the integrated multi-sourced journal content sequence by watermarking or lowering the resolution of the integrated multi-sourced journal content sequence until it is established that the publisher has the creative rights to the integrated multi-sourced journal content sequence.

FIG. 3 shows a diagram of an example of a multi-source journal content integration client 300. In the example of FIG. 3, the multi-source journal content integration client 300 includes a web browsing engine 302, a content editor display engine 304, a client-based content placement instruction engine 306, a client-based layer placement instruction engine 308, a superimposable layer display engine 310, a timeline display engine 312, and a multi-source content display engine 314. In this example, the multi-source journal content integration client 300 includes a local datastore 316 and a local storage buffer 318. The discussion below provides a description of the functionality of each of these engines and datastores.

In the example of FIG. 3, the web browsing engine 302, in operation allows a user of the multi-source journal content integration client 300 to access the Internet. In this example, the web browsing engine 302 is incorporated into an Internet browser. Existing Internet browsers include browsers manufactured by Microsoft®, Google®, Mozilla®, Apple®, and others. The web browsing engine 302 can be incorporated into personal computer, a mobile device, or other computing client.

In the example of FIG. 3, the web browsing engine 302 can run a host application. That is, the web browsing engine 302 can execute a browser plug-in in the Internet browser installed on the multi-source journal content integration client 300. The browser plug-in can provide an interface such as a graphical user interface (GUI) for a user to access the server-based content editing services. The browser plug-in can include a GUI to display content and layers on server datastores. For instance, the browser plug-in can have display capabilities like the capabilities provided by proprietary commercially available plug-ins like Adobe® Flash Player, QuickTime®, and Microsoft Silverlight®. The browser plug-in can also include an interface to execute server-initiated functionalities on server based engines.

In the example of FIG. 3, the content editor display engine 304, in operation, can launch an editor window for display on the multi-source journal content integration client 300. The editor window can be displayed in the host application on the multi-source journal content integration client 300. To launch and display the editor window, the content editor display engine 304 can call one or more APIs of the web browser plug-in, thereby allowing display of an editor window.

In the example of FIG. 3, the client-based content placement instruction engine 306, in operation, places a link to the content in the editor window. The client-based content placement engine 306 receives parameters, such as the server-address of the content to be placed, resolution, and playback speed. Based on these parameters, the client-based content placement instruction engine 306 places a link to the content (at the provided resolution, playback speed, etc.) in the editor window.

In the example of FIG. 3, the client-based layer placement instruction engine 308, in operation, places a link to an editing layer over the link to the content. Placing this link creates, on the server, a multi-source journal content sequence on the server.

In the example of FIG. 3, the superimposable layer display engine 310, in operation, displays links to editing layers as well as links to destination edit layer classifications in the edit window. Further, in this example, the timeline display engine 312, in operation, displays a link to the compilation timeline in the edit window. Additionally, the multi-source content display engine 314 can place a link to a multi-source journal content sequence in the edit window. As a result, the edit window can display a link to the multi-source journal content sequence, links to editing layers, and links to destination edit layer classifications. A user of the multi-source journal content integration client 300 has access to high-quality professional film editing of journalism pieces and documentaries without needing to install any editing software on the multi-source journal content integration client 300.

In the example of FIG. 3, the local datastore 316 can locally store any data on the multi-source journal content integration client 300. Also shown in FIG. 3 is the local storage buffer 318, which can buffer content to optimize editing and playback.

Figure 4:
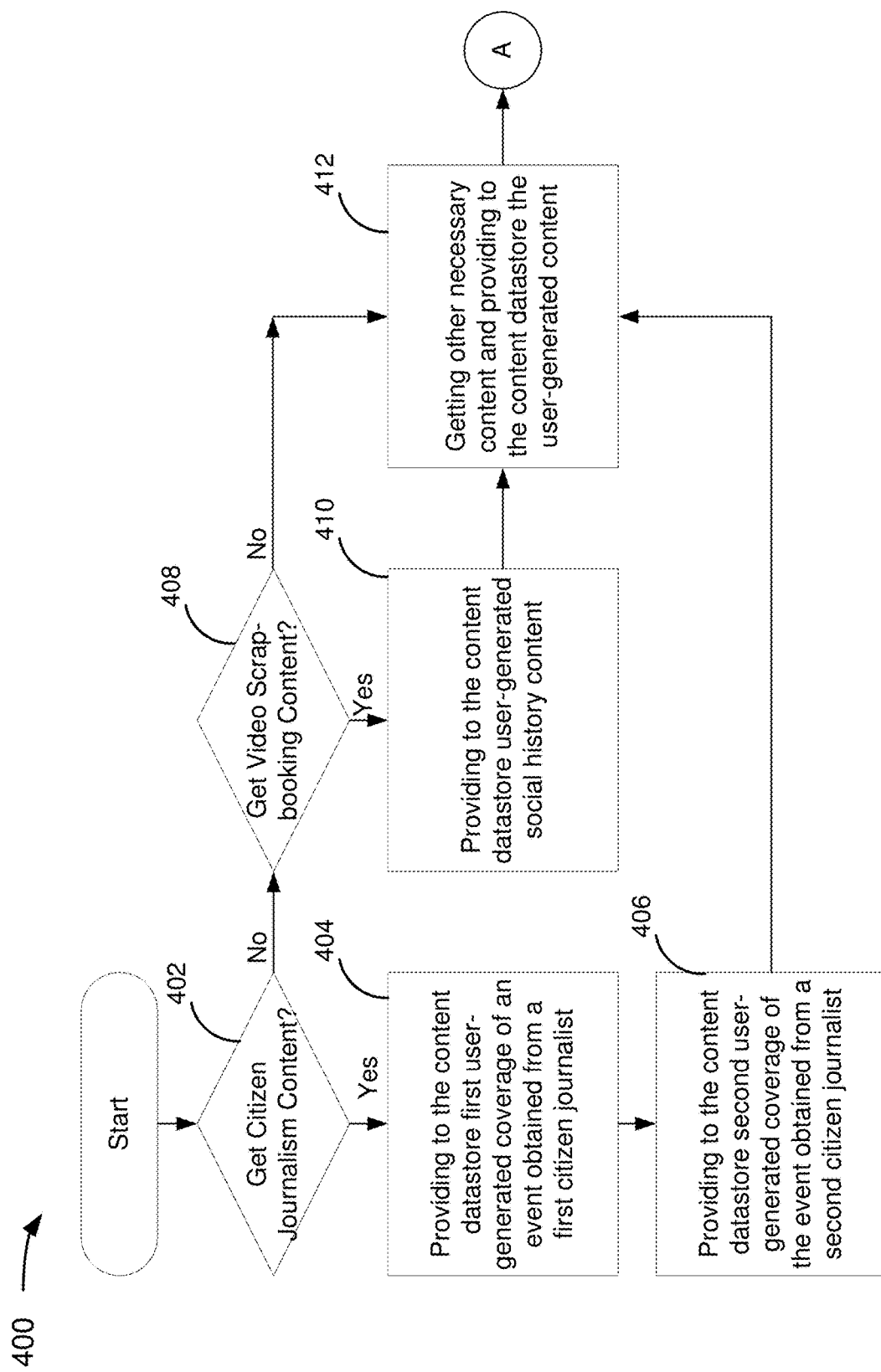
FIG. 4 shows a flowchart of an example of a method for providing journalism or video scrapbooking content.

FIG. 4 shows a flowchart 400 of an example of a method 400 for providing journalism or video scrapbooking content. In some implementations, the modules of the flowchart 400 and other flowcharts described in this paper are reordered to a permutation of the illustrated order of modules or reorganized for parallel execution. In the example of FIG. 4, the flowchart 400 can start at decision point 402, whether to get citizen journalism content. If the answer to the decision point 402 is yes, the flowchart 400 proceeds to module 404, providing to the content datastore first user-generated coverage of an event obtained from a first citizen journalist. The flowchart 400 can further proceed to module 406, providing to the content datastore second user-generated coverage of the event obtained from a second citizen journalist. In the example of FIG. 4, the flowchart can continue to step 412, which is further discussed below.

If the answer to the decision point 402 is no, the flowchart 400 can proceed to decision point 408, whether to get video scrapbooking content. If the answer to the decision point 408 is yes, the flowchart 400 can proceed to module 410, providing to the content datastore user-generated social history content. In this example, the flowchart 400 can proceed to module 412, getting other necessary content and providing to the content datastore the user-generated content. In the example of FIG. 4, the flowchart 400 then proceeds to transition point A.

Figure 5:
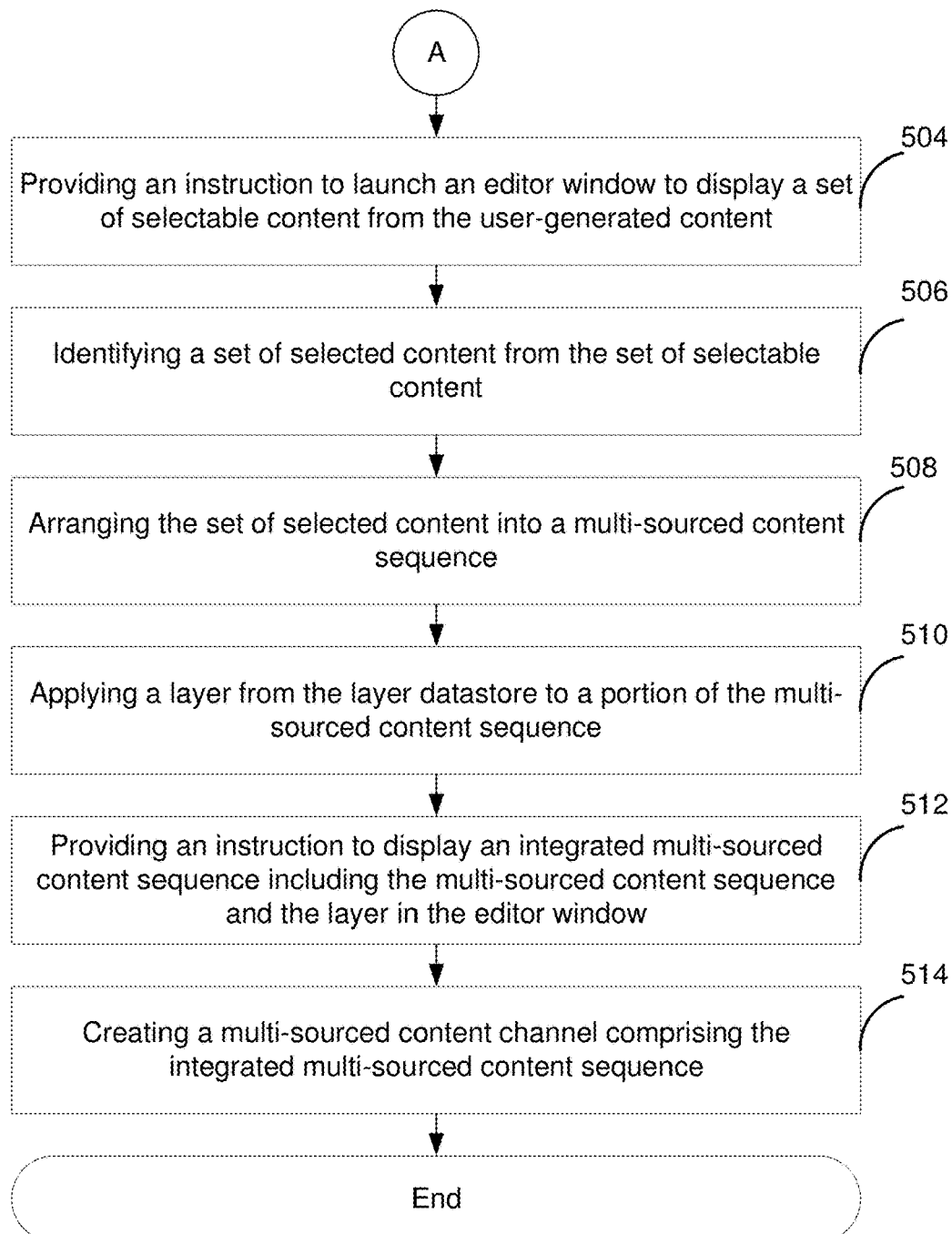
FIG. 5 shows a flowchart of an example of a method for integrating a multi-source journal content compilation.

FIG. 5 shows a flowchart of an example of a method 500 for integrating a multi-source journal content compilation. The flowchart 500 starts at transition point A and continues to module 504, providing an instruction to launch an editor window to display a set of selectable content from the user-generated content. In the example of FIG. 5, the flowchart 500 continues to module 506, identifying a set of selected content from the set of selectable content. The flowchart 500 can continue to module 508, arranging a set of selected content into a multi-sourced content sequence. The flowchart 500 can then continue to step 510, applying a layer from the layer datastore to a portion of the multi-sourced content sequence. The flowchart 500 can then continue to step 512, providing an instruction to display an integrated multi-sourced content sequence including the multi-sourced content sequence and the layer in the editor window. In the example of FIG. 5, the flowchart 500 can continue to step 514, creating a multi-sourced content channel comprising the integrated multi-sourced content sequence.

Figure 6:
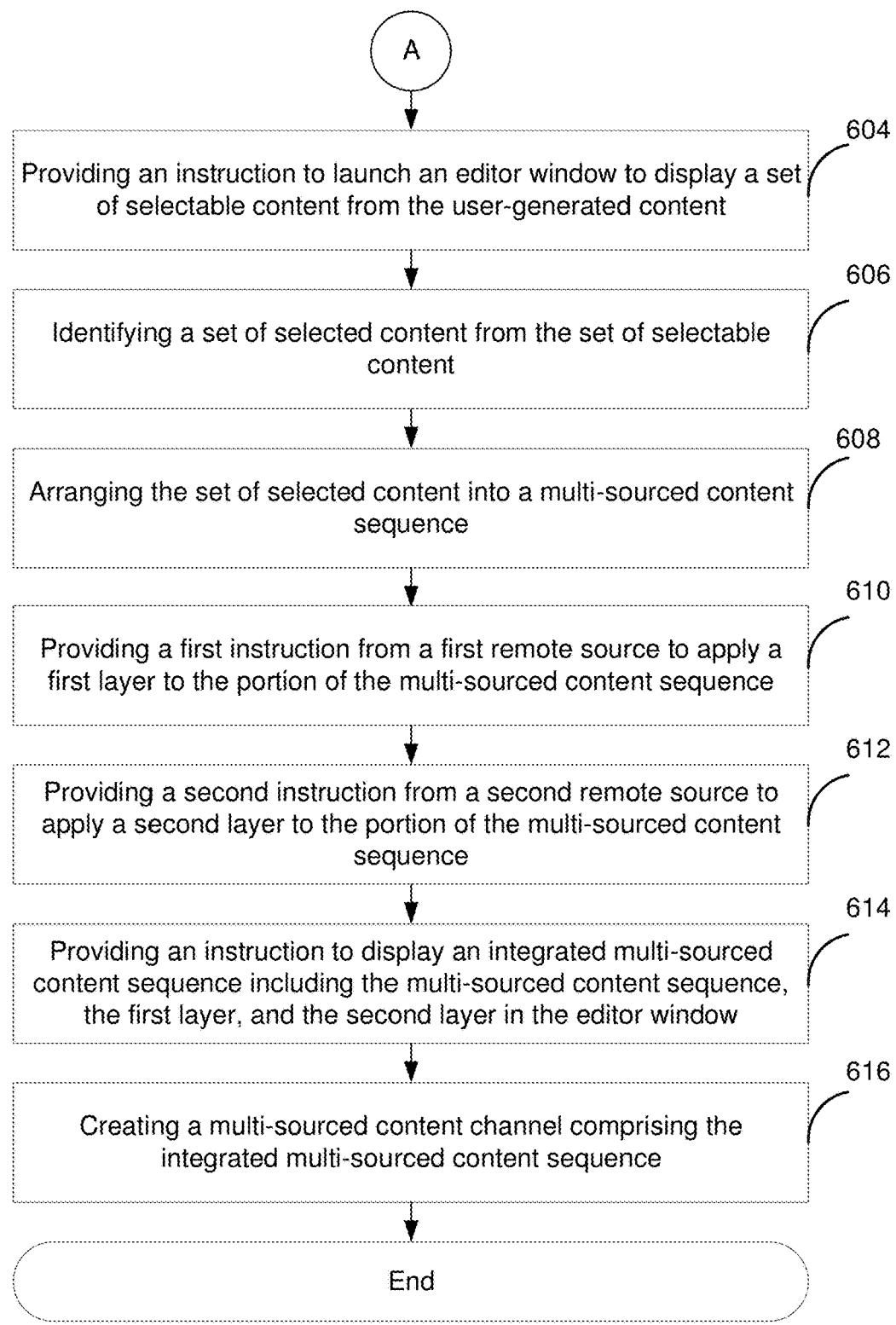
FIG. 6 shows a flowchart of an example of a method for integrating a multi-source journal content compilation using multiple remote editing sources.

FIG. 6 shows a flowchart of an example of a method 600 for integrating a multi-source journal content compilation using multiple remote editing sources. In the example of FIG. 6, the flowchart 600 starts at transition point A and continues to module 604, providing an instruction to launch an editor window to display a set of selectable content from the user-generated content. The flowchart 600 continues to module 606, identifying a set of selected content from the set of selectable content. The flowchart 600 can continue to module 608, arranging the set of selected content into a multi-sourced content sequence. The flowchart 600 can then continue to module 610, providing a first instruction from a first remote source to apply a first layer to the portion of the multi-sourced content sequence. The flowchart 600 can then continue to module 612, providing a second instruction from a second remote source to apply a second layer to the portion of the multi-sourced content sequence. The flowchart 600 can continue to module 614, providing an instruction to display an integrated multi-sourced content sequence including the multi-sourced content sequence, the first layer, and the second layer, in the editor window. The flowchart 600 can then continue to module 616, creating a multi-sourced content channel comprising the integrated multi-sourced content sequence.

Figure 7:
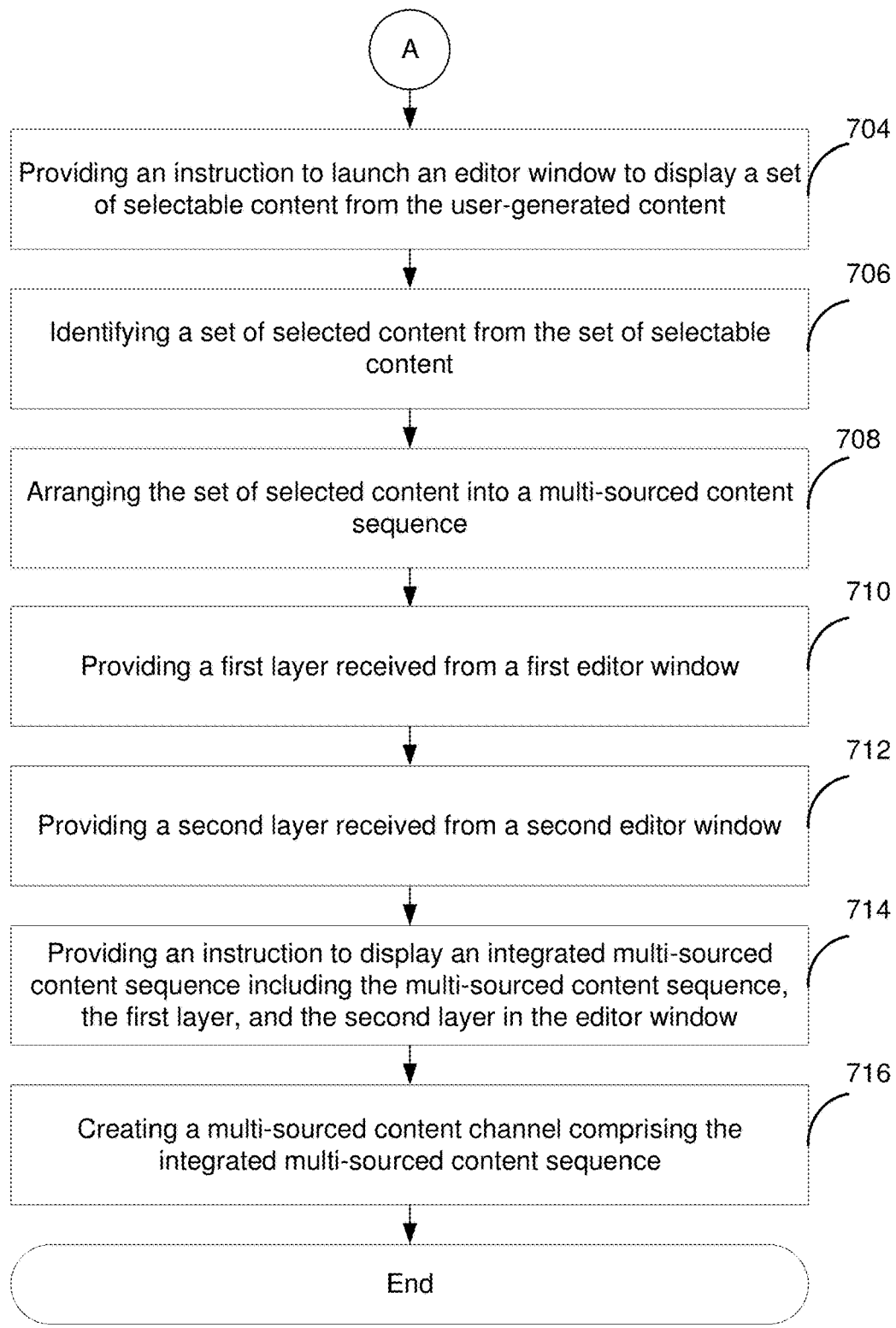
FIG. 7 shows a flowchart of an example of a method for integrating a multi-source journal content compilation using multiple editing windows.

FIG. 7 shows a flowchart of an example of a method 700 for integrating a multi-source journal content compilation using multiple editing windows. In the example of FIG. 7, the flowchart 700 starts at transition point A and continues to module 704, providing an instruction to launch an editor window to display a set of selectable content from the user-generated content. The flowchart 700 can continue to module 706, identifying a set of selected content from the set of selectable content. The flowchart 700 can then continue to module 708, arranging the set of selected content into a multi-sourced content sequence. The flowchart 700 can then continue to module 710, providing a first layer received from a first editor window. The flowchart 700 can then continue to module 712, providing a second layer received from a second editor window. The flowchart 700 can continue to module 714, providing an instruction to display an integrated multi-sourced content sequence including the multi-sourced content sequence, the first layer, and the second layer in the editor window. The flowchart 700 can continue to module 716, creating a multi-sourced content channel comprising the integrated multi-sourced content sequence.

Figure 8:
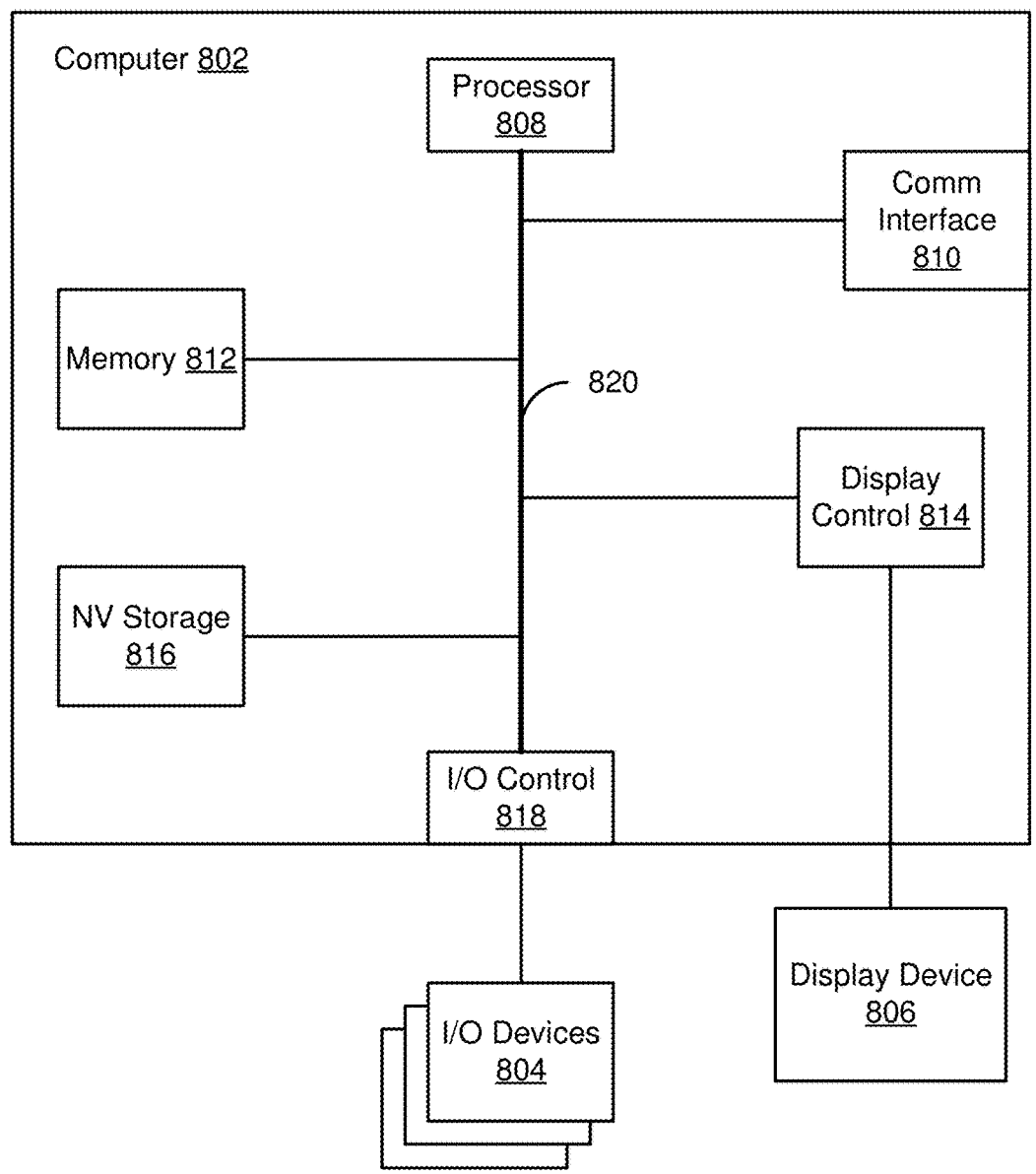
FIG. 8 shows an example of a computer.

FIG. 8 shows an example of a system on which techniques described in this paper can be implemented. The computer system 800 can be a conventional computer system that can be used as a client computer system, such as a wireless client or a workstation, or a server computer system. The computer system 800 includes a computer 802, I/O devices 804, and a display device 806. The computer 802 includes a processor 808, a communications interface 810, memory 812, display controller 814, non-volatile storage 816, and I/O controller 818. The computer 802 may be coupled to or include the I/O devices 804 and display device 806.

The computer 802 interfaces to external systems through the communications interface 810, which may include a modem or network interface. It will be appreciated that the communications interface 810 can be considered to be part of the computer system 800 or a part of the computer 802. The communications interface 810 can be an analog modem, ISDN modem, cable modem, token ring interface, satellite transmission interface (e.g. "direct PC"), or other interfaces for coupling a computer system to other computer systems.

The processor 808 may be, for example, a conventional microprocessor such as an Intel Pentium microprocessor or Motorola power PC microprocessor. The memory 812 is coupled to the processor 808 by a bus 820. The memory 812 can be Dynamic Random Access Memory (DRAM) and can also include Static RAM (SRAM). The bus 820 couples the processor 808 to the memory 812, also to the non-volatile storage 816, to the display controller 814, and to the I/O controller 818.

The I/O devices 804 can include a keyboard, disk drives, printers, a scanner, and other input and output devices, including a mouse or other pointing device. The display controller 814 may control in the conventional manner a display on the display device 806, which can be, for example, a cathode ray tube (CRT) or liquid crystal display (LCD). The display controller 814 and the I/O controller 818 can be implemented with conventional well known technology.

The non-volatile storage 816 is often a magnetic hard disk, an optical disk, or another form of storage for large amounts of data. Some of this data is often written, by a direct memory access process, into memory 812 during execution of software in the computer 802. One of skill in the art will immediately recognize that the terms "machine-readable medium" or "computer-readable medium" includes any type of storage device that is accessible by the processor 808 and also encompasses a carrier wave that encodes a data signal.

The computer system 800 is one example of many possible computer systems which have different architectures. For example, personal computers based on an Intel microprocessor often have multiple buses, one of which can be an I/O bus for the peripherals and one that directly connects the processor 808 and the memory 812 (often referred to as a memory bus). The buses are connected together through bridge components that perform any necessary translation due to differing bus protocols.

Network computers are another type of computer system that can be used in conjunction with the teachings provided herein. Network computers do not usually include a hard disk or other mass storage, and the executable programs are loaded from a network connection into the memory 812 for execution by the processor 808. A Web TV system, which is known in the art, is also considered to be a computer system, but it may lack some of the features shown in FIG. 8, such as certain input or output devices. A typical computer system will usually include at least a processor, memory, and a bus coupling the memory to the processor.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Techniques described in this paper relate to apparatus for performing the operations. The apparatus can be specially constructed for the required purposes, or it can comprise a general purpose computer selectively activated or reconfigured by a computer program stored in the computer. Such a computer program may be stored in a computer readable storage medium, such as, but is not limited to, read-only memories (ROMs), random access memories (RAMs), EPROMs, EEPROMs, magnetic or optical cards, any type of disk including floppy disks, optical disks, CD-ROMs, and magnetic-optical disks, or any type of media suitable for storing electronic instructions, and each coupled to a computer system bus.

Figure 9:
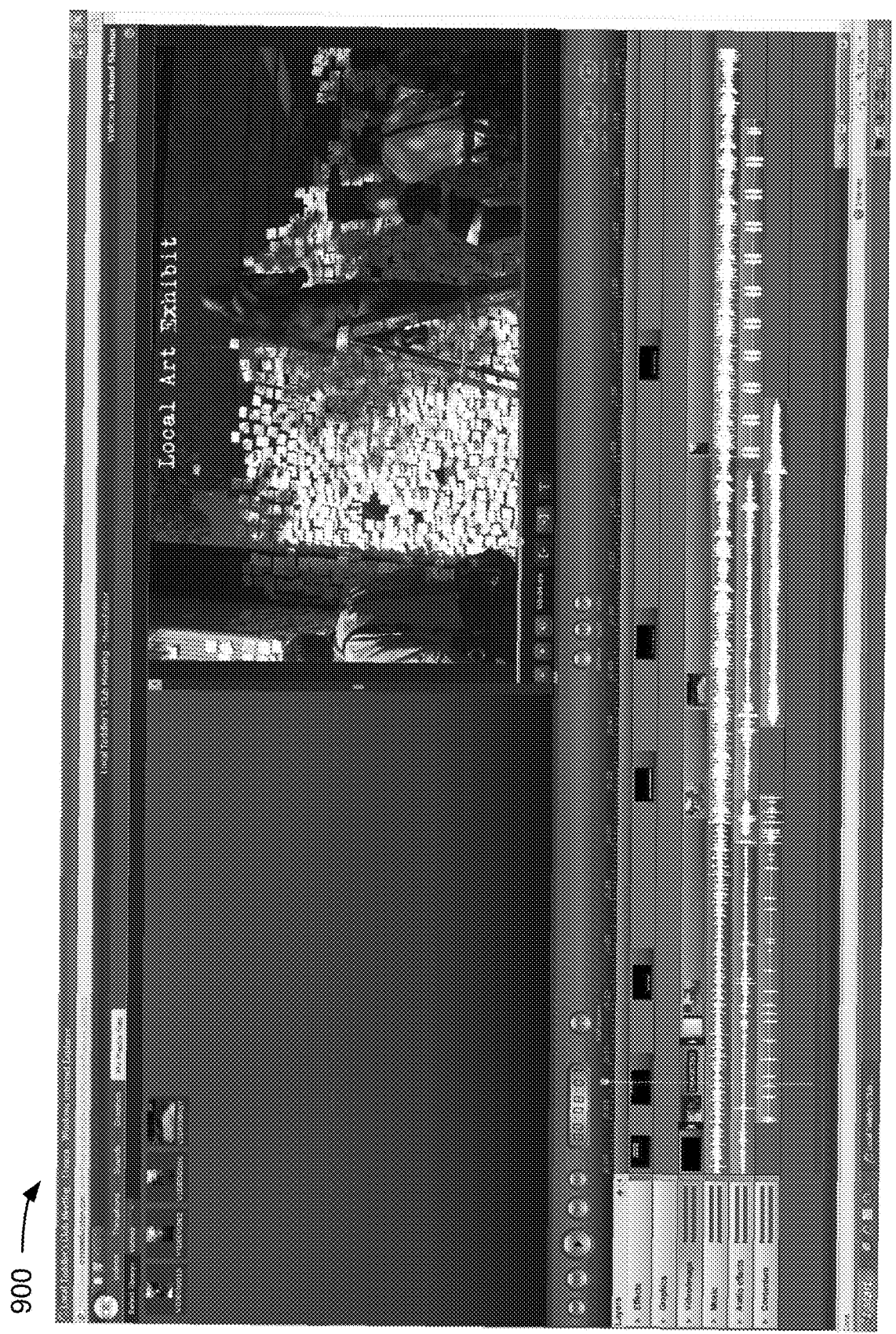
FIG. 9 shows an example of a multi-sourced journal content sequence client web browser screenshot.

FIG. 9 shows an example of a multi-sourced journal content sequence client web browser screenshot 900. In the example of FIG. 9, the screenshot 900 shows an editor window incorporated into an internet browser, here the Internet Explorer web browser from Microsoft®. The editor window displays content, namely, a video for editing in the upper right hand corner. The editor window displays a series of editing effects. In this example, editing effects include "Videos," "Transitions, "Sounds," Graphics," and "My media files." In this example, a user has selected the "My media files" set of editing layers and sees a set of content files, i.e., the video files "VIDEO0015," "VIDEO0062," "VIDEO0056," and "VIDEO0057." In this example, each of the content files "VIDEO0015," "VIDEO0062," "VIDEO0056," and "VIDEO0057" can be sourced from different citizen journalists and can relate to a single event. For instance, the content files here can relate to a toddler's club meeting occurring locally. In the example of FIG. 9, the content files "VIDEO0015," "VIDEO0062," "VIDEO0056," and "VIDEO0057" have been arranged at various points along the timeline, as shown in the "Video/image" editing layer. In the example of FIG. 9, the screenshot 900 shows that a user is adding layers to or otherwise editing the content file IMAG0597 showing a set of post-it notes on a store window to commemorate a memorial of an infamous computer pioneer; it is seen as a local art exhibit and a matter of public interest. The screenshot 900 further shows the addition of text at the point 00:08:07 in the timeline, producing a scene title for integrated journal content.

Figure 10:
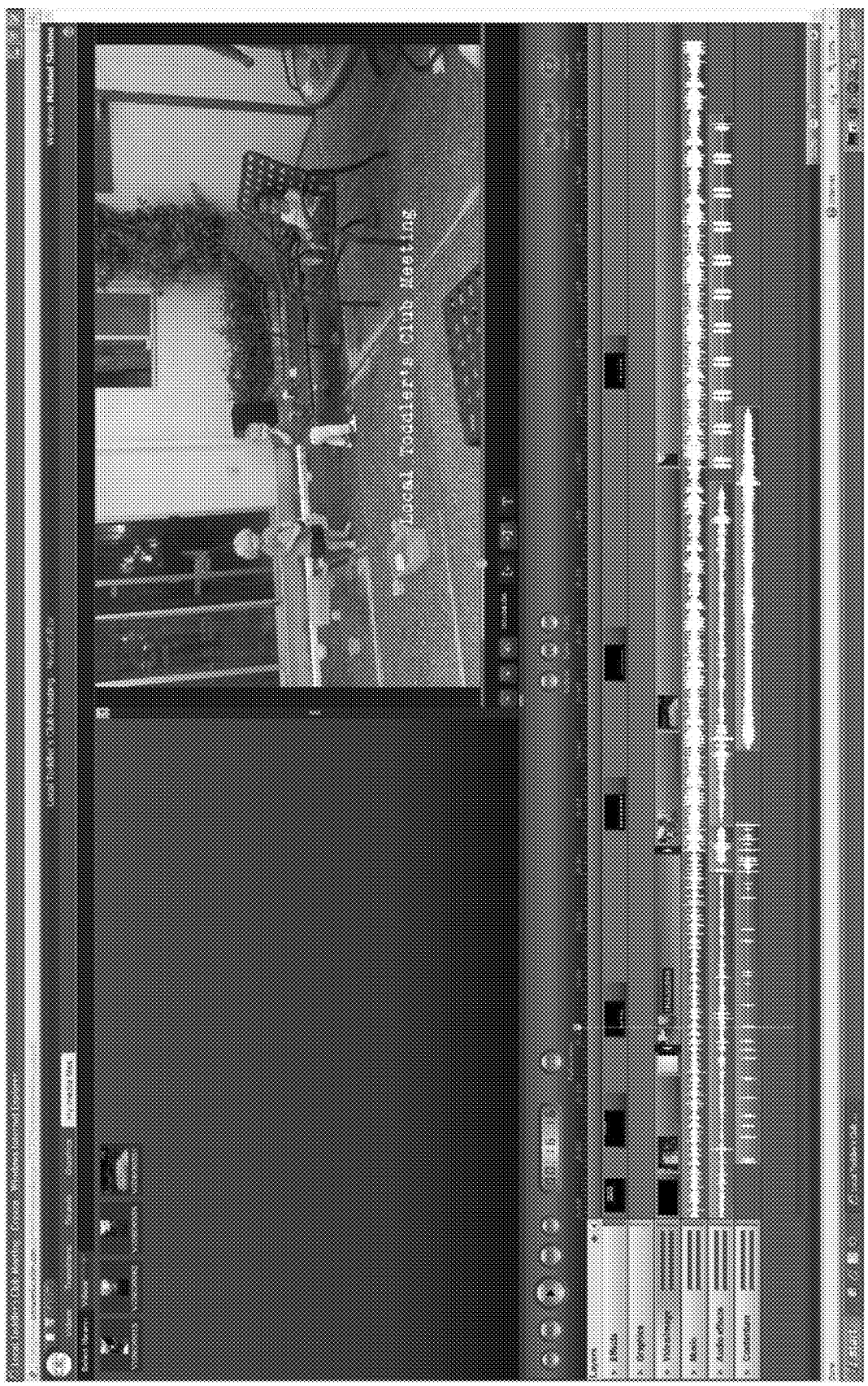
FIG. 10 shows a multi-sourced journal content sequence client web browser screenshot.

FIG. 10 shows a multi-sourced journal content sequence client web browser screenshot 1000. In the example of FIG. 10, the screenshot 1000 shows that a user is editing or otherwise adding layers to the content file IMAG0599, which shows a local toddler's club meeting.

Figure 11:
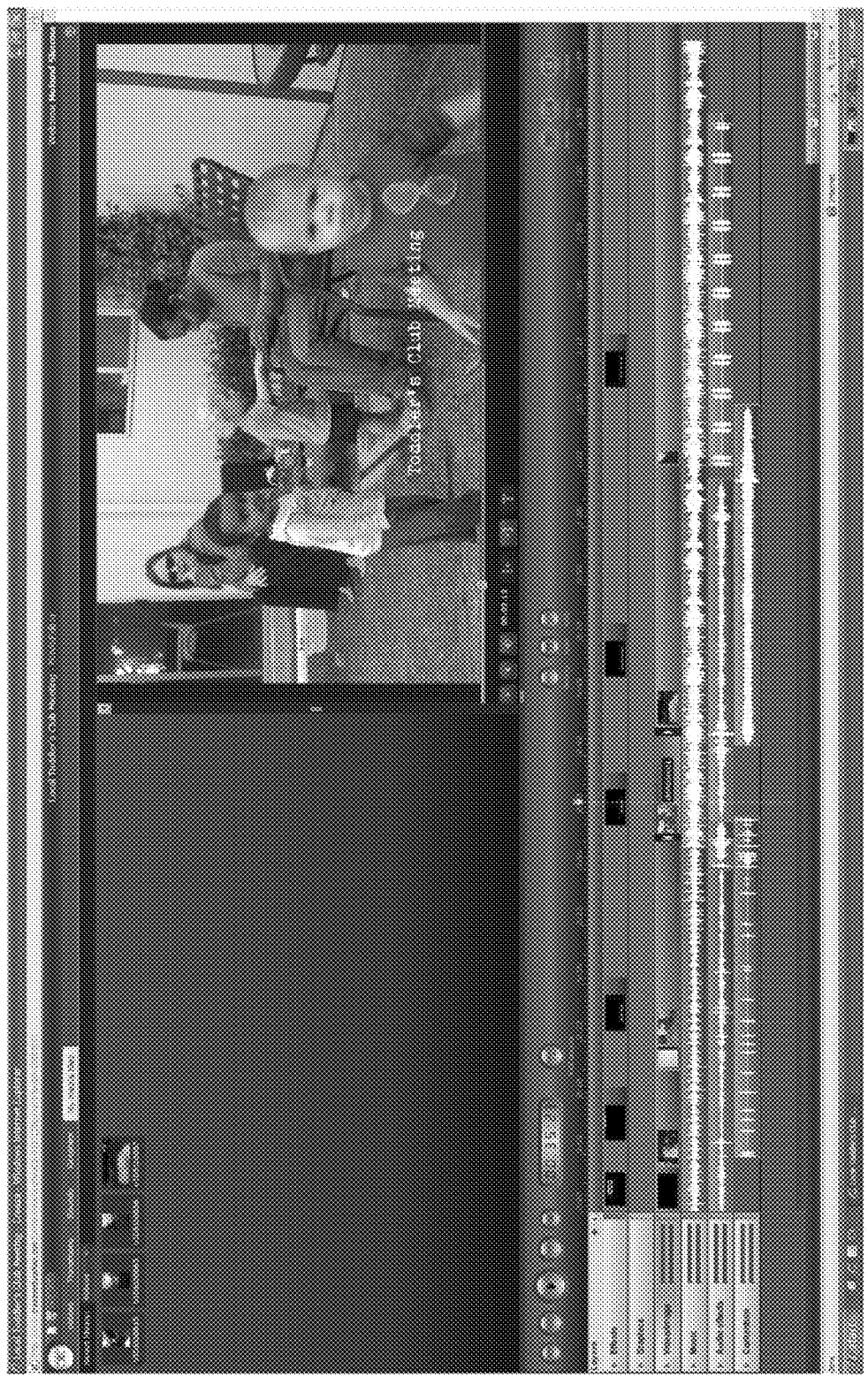
FIG. 11 shows a multi-sourced journal content sequence client web browser screenshot.

FIG. 11 shows a multi-sourced journal content sequence client web browser screenshot 1100. In the example of FIG. 11, the screenshot 1110 shows that a user is editing or otherwise adding layers to the content file IMAG0601, which shows a local toddler's club meeting.

Figure 12:
FIG. 12 shows a multi-sourced journal content sequence client web browser screenshot.

FIG. 12 shows a multi-sourced journal content sequence client web browser screenshot 1200. In the example of FIG. 12, the screenshot 1200 shows that a user is editing or otherwise adding layers to the content file VIDEO0056, which shows a something occurring after the local toddler's club meeting.

As disclosed in this paper, embodiments allow editors to create professional productions based on a wide variety of amateur and professional content gathered from numerous sources. Embodiments free editors from using only footage generated at large studios and monopolized by a few content generators. Embodiments also let individual content generators contribute their creative audio, images, and video without unrestricted release of their ideas and rights into the public domain. By facilitating the exchange of amateur and professional content from a wide variety of sources and giving editors professional, easily accessible editing tools, embodiments let editors create vivid content that is robust and not limited to one of a few sets of centralized narratives.

Although the foregoing embodiments have been described in some detail for purposes of clarity of understanding, the invention is not necessarily limited to the details provided.

Systems and Methods for Collaborative Online Content Editing.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 13:
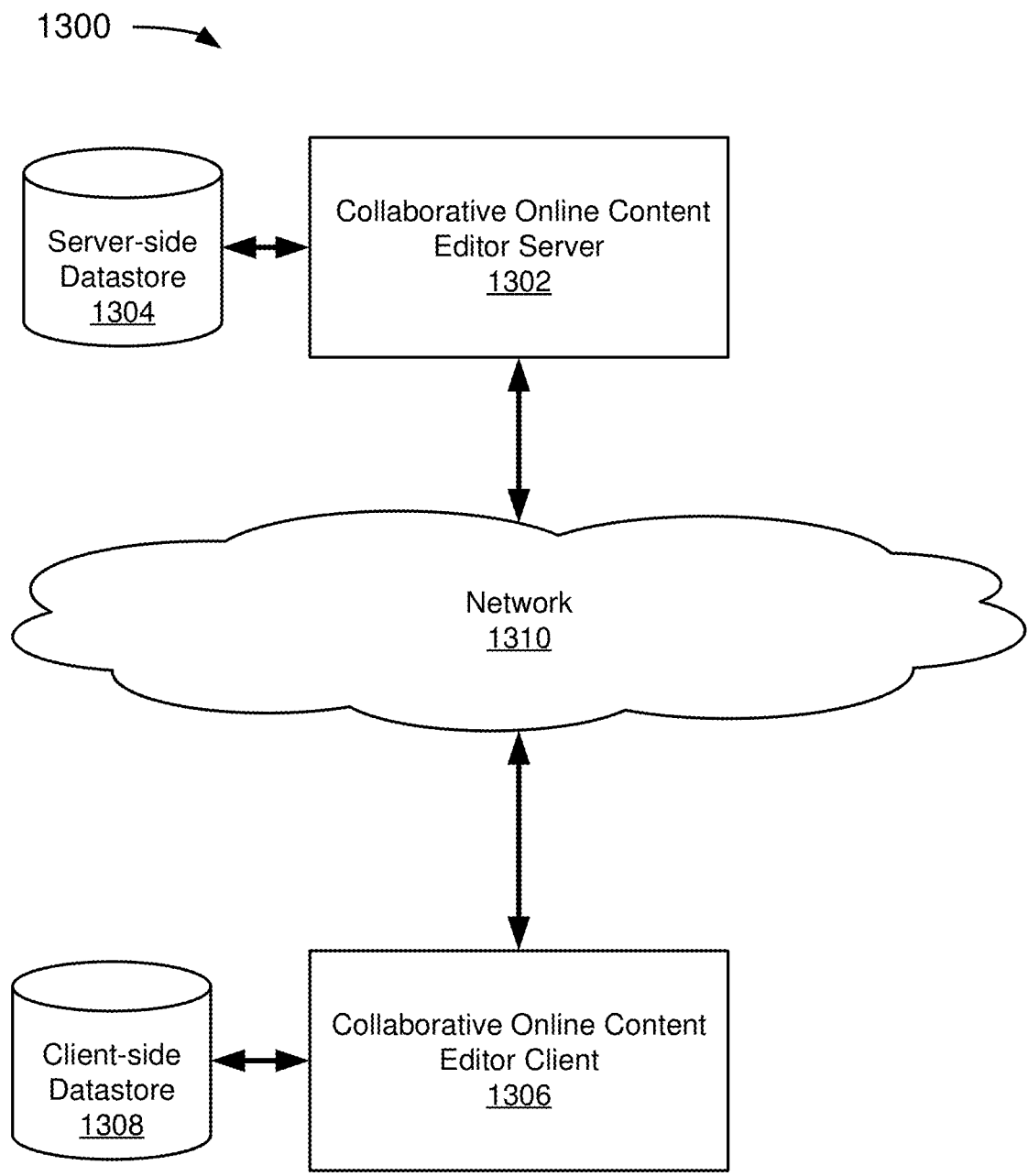
FIG. 13 depicts a diagram of an example of a collaborative online content editor system in accordance with some embodiments.

FIG. 13 depicts a diagram of an example of a collaborative online content editor system in accordance with some embodiments. The collaborative online content editor system 1300 includes a collaborative online content editor server 1302, a server-side datastore 1304 coupled to the collaborative online content editor server 1302, an collaborative online content editor client 1306, a client-side datastore 1308 coupled to the collaborative online content editor client 1306, and a network 1310 through which the online content editor client 1306 communicates with the collaborative online content editor server 1302. Through this arrangement, the online content editor client 1306 can leverage the computing resources and power of the collaborative online content editor server 1302 when creating or modifying collaborative content product, especially when the collaborative content product comprises high definition/quality graphics, image, audio, or video content. Often, the collaborative online content editor server 1302 comprises computing resources that surpass those of the collaborative online content editor client 1306, or computing resources that are better suited for content creation or modification than those of the collaborative online content editor client 1306. Though FIG. 13 depicts a single online content editor client, the system 1300 can include multiple online content editor clients that can communicate with the collaborative online content editor server 1302.

"Collaboratively-created content" as used herein includes any content authored by one or more users using the content creation/editing tools described in this paper, or some other content editing tool. Collaboratively-created content can include content initially based on/started from a vendor provided or user-created content, and then subsequently modified by one or more collaborative users. The collaboratively-created content can be created to be multi-layered content, comprising multiple content layers of different content types. High definition/quality as used herein includes content having definition or quality that is higher than the average definition or quality for the similar content. For example, high definition/quality audio content can include audio clips having a high sampling rate (e.g., 44 KHz), has a higher bit-rate or effective bit-rate (e.g., 256 Kbs), or is encoded in a lossless audio encoding format.

As used in this paper, an engine includes a dedicated or shared processor and, typically, firmware or software modules that are executed by the processor. Depending upon implementation-specific or other considerations, an engine can be centralized or its functionality distributed. An engine can include special purpose hardware, firmware, or software embodied in a computer-readable medium for execution by the processor. As used in this paper, a computer-readable medium is intended to include all mediums that are statutory (e.g., in the United States, under 35 U.S.C. 13013), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

In the example of FIG. 13, the collaborative online content editor system 1300 can enable a user at the collaborative online content editor client 1306 located remotely on the network 1310 to instruct the collaborative online content editor server 1302 to create or modify a collaborative content product, containing collaboratively-created content, on behalf of the client 1306. The created or modified collaboratively-created content can include proxy or non-proxy content items, but generally includes only proxy content items while the collaboratively-created content is being created and modified, and then non-proxy content items once the collaboratively-created content is rendered (e.g., for publication or sharing). The collaboratively-created content may be multi-layered content comprising a plurality of content layers, where each content layer comprises one or more content items from a content library, and the content items are high definition/quality content items or versions thereof.

To collaborate modification operations, on the collaborative content product, between two or more collaborative online content editor clients, the collaborative online content editor server 1302 can prepare a copy of the collaborative content product (also referred to herein as an "intermediary collaborative content product") for each collaborative online content editor client (e.g., including the collaborative online content editor client 1306) desiring to modify the collaborative content product. For some embodiments, the intermediary collaborative content product can also prepared as a previous of the latest version of the collaborative content product. Additionally, the intermediary collaborative content product can be a proxy version of the collaborative content product (e.g., to save network bandwidth or reduce processing time). Though the intermediary collaborative content product is generally of the latest version of the collaborative content product, various implementations may perform an intermediary collaborative content product to be based off a previous version of the collaborative content product.

Once prepared by the collaborative online content editor server 1302, the intermediary collaborative content product can be maintained by and stored at the collaborative online content editor server 1302 on behalf of each collaborative online content editor client, can be sent to the respective collaborative online content editor client, or both (e.g., where the intermediary collaborative content product for some collaborative online content editor clients is maintained at the server 1302, and the intermediary collaborative content product for others is maintained at the respective clients). Then, when the collaborative online content editor client 1306, for example, desires to apply a modification to the collaborative content product, it does so using its respective intermediary collaborative content product. In some implementations where the intermediary collaborative content product for the collaborative online content editor client 1306 is maintained at the server 1302, the client 1306 can instruct the server 1302 to perform the desired modifications the respective intermediary collaborative content product and, subsequently, to apply update the latest version of the collaborative content product with the modification to the respective intermediary collaborative content product. In some implementations where the intermediary collaborative content product for the collaborative online content editor client 1306 is maintained at the client 1306, the client 1306 can directly modify its intermediary collaborative content product and, subsequently, send the modifications applied to its intermediary collaborative content product to the server 1302 (which can update the latest version of the collaborative content product with the received modification).

With respect to some implementations, a modification applied to the collaborative content product (e.g., through use of the intermediary collaborative) by the collaborative online content editor client 1306 can include, in addition to content layer modification operations, such operations as: adjusting copyright use limitations on some or all of the collaborative content product, locking some or all portions of the collaborative content product such that some or all of other collaborative online content editor clients are prevented from modifying the designated locked portions, adding watermarks to some or all of the collaborative content product, or tagging objects (e.g., people, places, or things) shown in the collaborative content product.

As the collaborative online content editor server 1302 creates or modifies the collaborative content product, the server 1302 can provide the online content editor client 1306 with an updated intermediary collaborative content product based on the latest version of the collaborative content product (e.g., after the latest modification from an collaborative online content editor client has been applied). The online content editor client 1306 can use the resulting intermediary collaborative content product (generally comprising having proxy content items) for review or editing purposes as the client continues to modify the collaborative content product.

As the collaborative online content editor server 1302 creates and modifies the collaborative content product (e.g., in accordance with modifications being received from collaborative online content editor clients), one or more versions of the collaborative content product may be stored on the server-side datastore 1304. When the online content editor client 1306 receives new or updated versions of intermediary collaborative content product, the client 1306 can store these on the client-side datastore 1308 before the client 1306 directly modifies the new/updated intermediary collaborative content product.

Those skilled in the art will appreciate that for various embodiments, when a content modification or content update is transferred between the collaborative online content editor server and the collaborative online content editor client 1306, such content modification or update can comprise a list of modification instructions (e.g., including layer identification information, timeline information, content identification information), a copy of the modified content in its entirety, or a copy of the content portions that are modified/updated.

A datastore can be implemented, for example, as software embodied in a physical computer-readable medium on a general- or specific-purpose machine, in firmware, in hardware, in a combination thereof, or in an applicable known or convenient device or system. Datastores in this paper are intended to include any organization of data, including tables, comma-separated values (CSV) files, traditional databases (e.g., SQL), or other applicable known or convenient organizational formats. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure.

Eventually, at the instruction of the online content editor client 1306, the collaborative online content editor server 1302 can publish a finalized version of the collaborative content product for download or sharing with others. During publication, the collaborative online content editor server 1302 can render the latest version of the collaborative control product (as it resides on the server 1302) such that proxy content items contained in the collaborative control product are replaced with non-proxy content item. For example, during the rendering, the server 1302 can replace low definition/quality content items in the collaborative content product with high-quality definition/high quality counterpart or some version thereof. For some embodiments, the collaborative online content editor server 1302 will replace low definition/quality content with corresponding high-quality definition/high quality content based on payment by a user. Absent payment, the user can be prevented from publishing the collaborative content product, or the user is left with publishing collaborative content product using proxy content items. For example, a user may have to make payment before the collaborative content product is published with non-proxy content items (e.g., high definition/quality content items). The resulting rendered collaborative content product can then be downloaded or shared with others.

Figure 14:
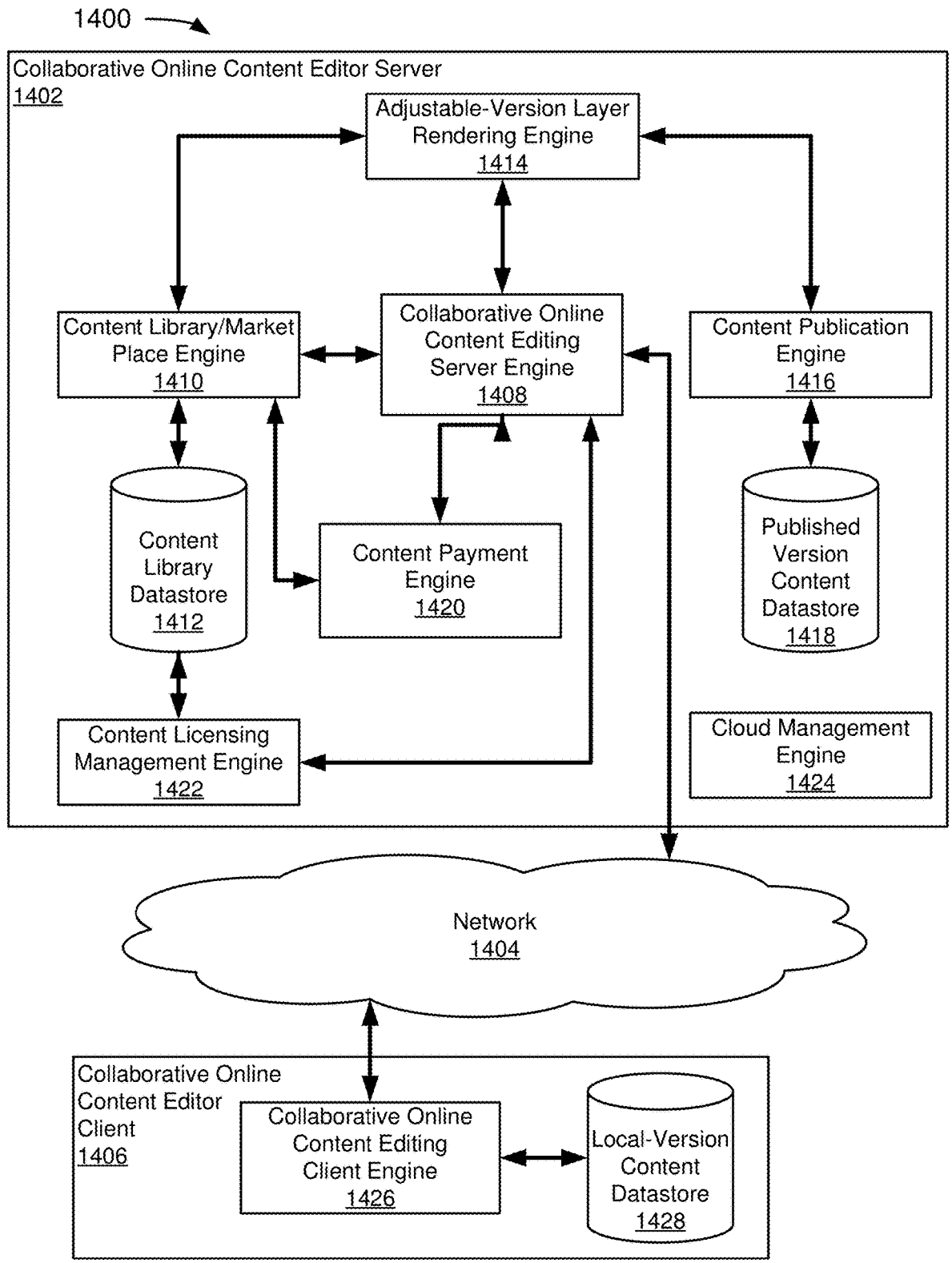
FIG. 14 depicts a diagram of an example of a client-server system for collaborative online content editing in accordance with some embodiments.

FIG. 14 depicts a diagram of an example of a system for collaborative online content editing in accordance with some embodiments. The system 1400 for collaborative online content editing includes a collaborative online content editor server 1402, an collaborative online content editor client 1406, and a network 1404 facilitating communication between the server 1402 and the client 1406. As described herein, the system 1400 can enable a user at the online content editor client 1406 located remotely on the network 1404 to instruct the collaborative online content editor server 1402 to create or modify collaborative content product comprising collaboratively-created content possibly including proxy or non-proxy content items. As discussed herein, for some embodiments, the online content editor client 1406 can instruct the collaborative online content editor server 1402 through a collaborative online content editing client engine 1426 located at the client 1406. Subsequently, the collaborative online content editor server 1402 can provide, and the online content editor client 1406 can receive, a version of the created or modified collaborative content product, such as an intermediary collaborative content product, generally containing proxy content items.

In the example of FIG. 14, the collaborative online content editor server 1402 comprises a collaborative online content editing server engine 1408, a content library/market place engine 1410, a content library store 1412, an adjustable-version layer rendering engine 1414, a content publication engine 1416, a published version content datastore 1418, and a content payment engine 1420. The collaborative online content editor server 1402 further comprises a content licensing management engine 1422 and a cloud management engine 1424.

In the example of FIG. 14, the collaborative online content editing server engine 1408 creates or modifies user-created content at the collaborative online content editor server 1402 on behalf of the online content editor client 1406. In certain embodiments, the collaborative online content editing server engine 1408 can establish a connection with the online content editor client 1406 over the network 1404, can receive commands relating to content creation or modification over a network connection, can perform content creation or modification operations in accordance with commands received from the online content editor client 1406, and can transmit to the online content editor client 1406 a version of the created or modified collaborative content product (e.g., intermediary collaborative content product). As noted herein, the created or modified user-created content may be multi-layered content comprising one or more content layers, each content layer comprising one or more content items from a content library. The content items utilized can be original content items or proxy versions thereof.

In order to perform various operations, the collaborative online content editing server engine 1408 is coupled to the content library/market place engine 1410, the adjustable-version layer rendering engine 1414, the content publication engine 1416, and the content payment engine 1420. As discussed in detail below, the collaborative online content editing server engine 1408 can access proxy and non-proxy content items and information relating to such content items through the content library/market place engine 1410, can render one or more (content) layers of the collaborative content product at an adjusted quality or version (e.g., copyright-limited use version content items, for-cost content items, free content items, watermarked content items, high-quality content items, or lower quality content items) using the adjustable-version layer rendering engine 1414, and can use the content publication engine 1416 to publish the collaborative content product at an adjusted quality or version for download or sharing purposes. The collaborative online content editing server engine 1408 can receive pre-payment or post-payment through the content payment engine 1420 to permit access to for-purchase content items or to publish the user-defined content items using for-purchase content (e.g., content of varying quality or versions, such as high definition/quality content items).

In the example of FIG. 14, the content library/market place engine 1410 is coupled to the content library datastore 1412 and manages the content items stored therein. For some embodiments, the content library/market place engine 1410 can be responsible for adding, deleting and modifying content items stored on the content library datastore 1412, for retrieving a listing of content items stored on the content library datastore 1412, for providing details regarding content items stored on the content library datastore 1412, and for providing to other engines content items from the content library. For example, the content library/market place engine 1410 can provide content items to the collaborative online content editing server engine 1408 as a collaborative user reviews and selects content items to be added to the collaborative content product. In another example, the content library/market place engine 1410 can provide content items to the adjustable-version layer rendering engine 1414 as the engine 1414 renders one or more layers of the collaborative content product.

The content library/market place engine 1410 can also provide a marketplace where user-posted market items, such collaboratively-created content items (e.g., collaborative content product), individual-created, content items, and user uploaded content items, can be marketed to others (e.g., users) having access to the marketplace. The content library/market place engine 1410 can be coupled to the content payment engine 1410 to facilitate purchases through the marketplace. When a posted market items sells, the content library/market place engine 1410 can be configured to credit the user/users associated with the market item with some or all of the funds from the purchase. Depending on the implementation, a user can charge varying prices for vary qualities or versions of a market item. The content library/market place engine 1410 can also be configured to allow visitors of the marketplace to rent market items.

In the example of FIG. 14, the content library datastore 1412 stores content items that can be used in the collaborative content product. The content items of the content library datastore 1412 can include, without limitation, audio content, video content, image content, graphics contents, and user-provided content. In some embodiments, the user-provided content can include the collaborative content product that was created or modified using the collaborative online content editor server 1402 and subsequently added to the content library datastore 1402, and user content uploaded from the online content editor client 1406 to the collaborative online content editor server 1402. The content items of the content library datastore 1412 can also include, without limitation, free content that can be used in collaborative content product without need of payment, for-purchase content that can be reviewed only after user payment, content that can be added to collaborative content product only after user payment, and content that can be used in the publication of collaborative content product only after user payment.

In some embodiments, the high definition/quality content items can be added to, removed from, and adjusted within the user-created item without need of payment. When the user requests publication of the collaborative content product, the collaborative online content editor server 1402 can request payment before publication of the collaborative content product is allowed. Alternatively, a payment can be requested in order for the collaborative content product to be published using the high definition/quality content rather a proxy version of the high definition/quality content.

In some embodiments, the collaborative online content editor server 1402 can use proxy versions of the content items when performing creation and modification operations on the collaborative content product (e.g., through the intermediary collaborative content product, where the use of the proxy version continues until publication of the collaborative content product. In some embodiments, the content library/market place engine 1410 can provide the server 1402 with the proxy version of the content item utilized during creation and modification operations. Depending on the embodiment, the content library/market place engine 1410 can generate the proxy version as it is requested by various engines (e.g., the adjustable-version layer rendering engine 1414, or the collaborative online content editing server engine 1408), or the content library/market place engine 1410 can provide the proxy version as stored on the content library datastore 1412. As described herein, the proxy version of the high definition/quality content can also be utilized by the collaborative online content editing server engine 1408 when transmitting previews of the content to the online content editor client 1406 or when transmitting an intermediary collaborative content product to the online content editor client 1406.

The content stored on the content library datastore 1412 (hereafter, also referred to as "content items" or "library content items") can have various associated properties (i.e., content item properties) that provide details regarding aspects of the content items. In certain embodiments, the content item properties can comprise such information as content type, content duration, content usage permissions (e.g., licensing rights), content cost parameters (e.g., free to use until the collaborative content product is published, or is published using high definition/quality content), content data size, content source (e.g., user provided, or third party author), or content creation or modification date. Through collaborative online content editing server engine 1408, a user can review listings of content items in the content library datastore 1412 (e.g., available or unavailable content), review details regarding content items in the content library (e.g., price, usage parameters, content type, duration where applicable, or content definition/quality), manage content items in the content library datastore 1412 (e.g., add, delete, or modify content items in the content library), and add content items from the content library datastore 1412 to collaborative content product.

In the example of FIG. 14, the adjustable-version layer rendering engine 1414 renders one or more layers of the collaborative content product using content items provided by the content library/market place engine 1410 from the content library datastore 1412. The content items provided to the adjustable-version layer rendering engine 1414 can be an original version of the content item or a lesser definition/quality version of the same. As the adjustable-version layer rendering engine 1414 renders layers of the collaborative content product, the collaborative online content editing server engine 1408 can specify to the adjustable-version layer rendering engine 1414 the desired quality or version for the resulting layers.

For instance, the collaborative online content editing server engine 1408 can specify that the layers of the collaborative content product, comprising high definition/quality content items, be rendered using a low definition/quality version of the high definition/quality content items. Thereafter, the collaborative content product comprising layers of low definition/quality content can be provided to the online content editor client 1406 by the collaborative online content editing server engine 1408 for preview or editing purposes, as an intermediary collaborative content product, or can be provided to the content publication engine 1416 (e.g., for free publication of collaborative content product comprising proxy content items). In some embodiments, the collaborative online content editing server engine 1408 can specify that the layers of the collaborative content product, comprising high definition/quality content items, be rendered using the high definition/quality content items, but only at the time of publication through the content publication engine 1416, or only after the user submits payment through the content payment engine 1420.

In the example of FIG. 14, the content publication engine 1416 receives collaborative content product rendered by the adjustable-version layer rendering engine 1414 and publishes the collaborative content product. The collaborative content product can be published such that the collaborative content product can be downloaded and saved by the user or others as a stand-alone content file (e.g., MPEG or AVI file), or such that collaborative content product can be shared to other over the network (e.g., posted to a website so that others can play/view the collaborative content product). Once published, the collaborative content product can be stored on the published version content datastore 1418. For some embodiments, the published collaborative content product can be added to the content library datastore 1412 for reuse in other collaborative content product. Depending on the embodiment, the published collaborative content product can be added to the content library datastore 1412 as for-purchase content (for example, via the content library/market place engine 1410, with the sales proceeds being split between amongst the user and the online content editor service provider), or added to the content library datastore 1412 as free content available to the public. The user can also define content usage parameters (i.e., licensing rights) for their collaborative content product when the collaborative content product is added to the content library datastore 1412.

In the example of FIG. 14, the content payment engine 1420 facilitates user payment to the collaborative online content editor server 1402, and can determine the level of functionality provided by the collaborative online content editor server 1402, or the level of quality for or the version of content items within the collaborative content product. For example, once payment has been received by the content payment engine 1420 and the content payment engine 1420 has informed the collaborative online content editing server engine 1408 of such payment, the collaborative online content editing server engine 1408 can allow the user to access certain content items in the content library datastore 1412 (e.g., for-purchase content), can allow the user to perform certain content creation or modification operations (e.g., splitting a content layer), or can allow the user to publish the collaborative content product with high definition/quality content. In some embodiments, the quality or version of the content item within the collaborative content product can be variable and determined based on the amount payment made by the user. The content payment engine 1420 can maintain an account, where the user can maintain a positive balance from which funds are deducted as payments are made to the collaborative online content editor server 1402, or where charges are incurred to the account and the user submits payment some time after (e.g., a credit system). In various embodiments, the collaborative online content editing server engine 1408 can inform the content payment engine 1420 of the costs accrued by the user as he or she uses content items from the content library datastore 1412 in the collaborative content product, or as certain functionality of the collaborative online content editing server engine 1408 is utilized. As noted herein, the pricing for content items can be stored with the content items in the content library datastore 1412.

In the example of FIG. 14, the content licensing management engine 1422 can determine the licensing rights and permissions of content items stored on the content library datastore 1412, and inform the collaborative online content editing server engine 1408 of such rights and permissions. The collaborative online content editing server engine 1408, in turn, can adaptively control its own functionality in accordance with the licensing rights and permissions of the content item as the content item is utilized in the collaborative content product. For instance, where the content licensing rights and permissions of a certain content item restricted the content item from being split during creation or modification of the collaborative content product (i.e., the content item has to remain intact in the collaborative content product), the collaborative online content editing server engine 1408 can automatically disable a split content layer command with respect to that certain content item. In another example, the licensing rights and permissions can indicate whether certain content item can be utilized in collaboratively-created content, or has limitations on how many collaborative users can utilize the content item. Other content licensing rights and permissions can include publication limitations on the collaborative content product, or limitations on use of content items based on the existing content of the collaborative content product. The content licensing management engine 1422 cam inform the collaborative online content editing server engine 1408 of the cost of certain content items based on their use in accordance with the licensing rights and permissions. For some embodiments, the authors of the content items can configure the licensing rights and permissions for their content items, which is then stored on the content library datastore 1412.

In some embodiments, where the collaborative online content editor server 1402 is implemented using virtual or cloud-based computing resources, such virtual or cloud-based computer resources can be managed through the cloud management engine 1424. The cloud management engine 1424 can delegate various content-related operations and sub-operations of the server 1402 to virtual or cloud-based computer resources, and manage the execution of the operations. Depending on the embodiment, the cloud management engine 1424 can facilitate management of the virtual or cloud-based computer resources through an application program interface (API) that provides management access and control to the virtual or cloud-based infrastructure providing the computing resources for the collaborative online content editor server 1402.

In the example of FIG. 14, the online content editor client 1406 comprises a remote online content editor user interface, as part of the collaborative online content editing client engine 1426, and a local-version content datastore 1428 coupled to the collaborative online content editing client engine 1426. The collaborative online content editing client engine 1426 facilitates the creation or modification of collaborative content product at the collaborative online content editor server 1402 by the online content editor client 1406. As noted herein, the collaborative online content editing client engine 1426 can establish a connection with the collaborative online content editing server engine 1408 over the network 1404, and then issue content creation and modification commands to the collaborative online content editing server engine 1408. In accordance with the issued commands, the collaborative online content editing server engine 1408 can perform the content creation or modification operations at the collaborative online content editor server 1402, and can return to the remote online content editor user interface engine 1426 a proxy version of the resulting collaborative content product.

Alternatively, the online content editor client 1406 can modify content by receiving an intermediary collaborative content product based on the latest version of the collaborative content product, modifying the intermediary collaborative content product, and then uploading the modifications to the intermediary collaborative content product to the collaborative online content editor server 1402 so that the edits can be consistently applied to collaborative content product residing on the server 1402. When the intermediary collaborative content product is uploaded from the online content editor client 1406 to the collaborative online content editor server 1402 to facilitate modification of the collaborative content product, various implementations can utilize one or more methods for optimizing the network bandwidth usage. More regarding such optimization methods are described herein in association with FIG. 5.

Depending on the embodiment, the collaborative online content editor server 1402 can provide the proxy version of collaborative content product (e.g., intermediary collaborative content product) as a content stream that is buffered and played through the remote online content editor user interface engine 1426, or as a content file that is playable by the remote online content editor user interface engine 1426 once the content file has been downloaded to the online content editor client 1406 and stored to the local-version content datastore 1428.

Figure 15:
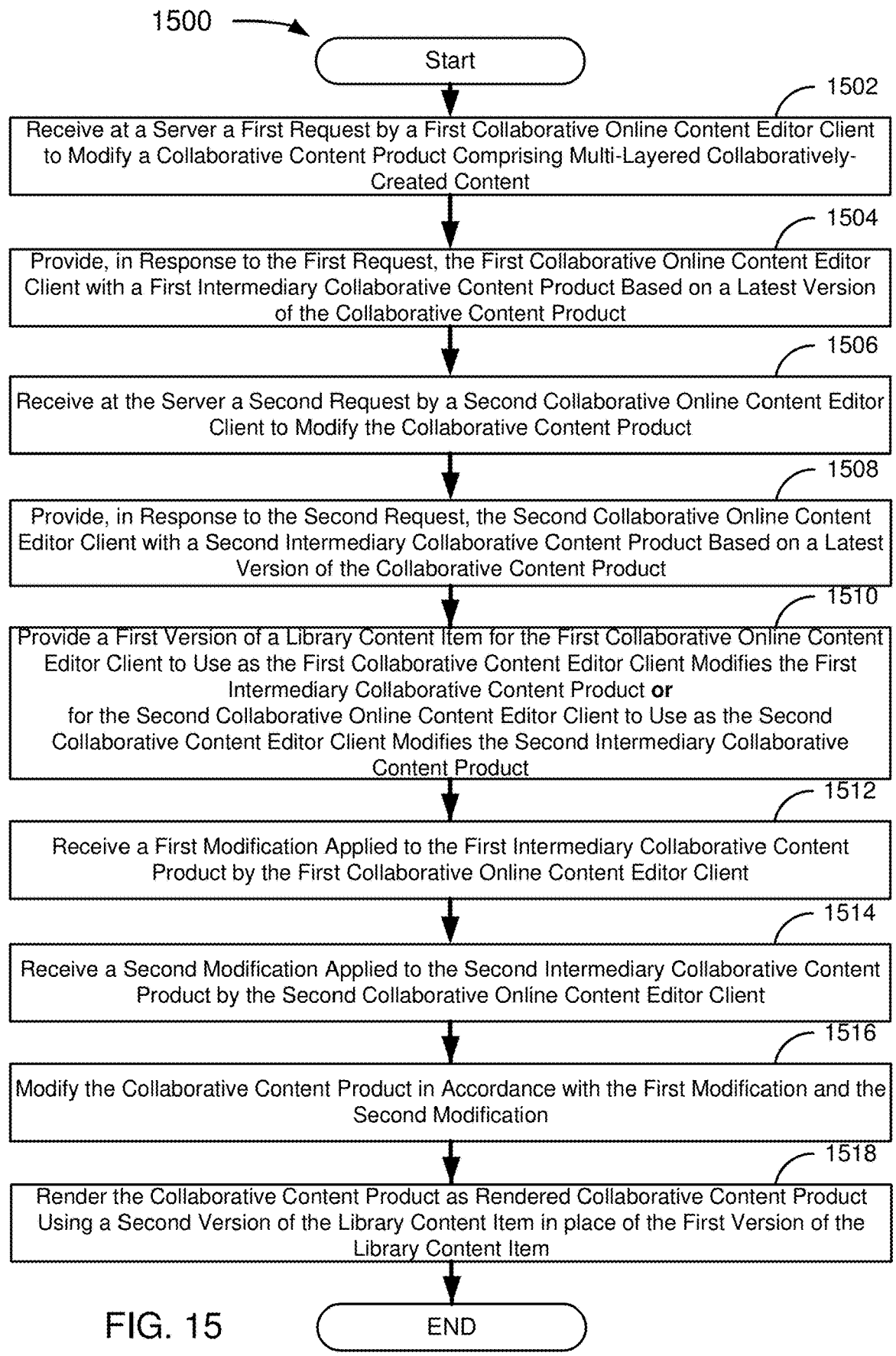
FIG. 15 depicts a flowchart of an example of a server-side method for collaborative online content editing in accordance with some embodiments.

FIG. 15 depicts a flowchart 1500 of an example of a server-side method for collaborative online content editing in accordance with some embodiments. In some implementations, the modules of the flowchart 1500 and other flowcharts described in this paper are rendered to a permutation of the illustrated order of modules or reorganized for parallel execution. In the example of FIG. 15, the flowchart 1500 starts at module 1502 with receiving at a server a first request by a first collaborative online content editor client to modify a collaborative content product comprising multi-layered collaboratively-created content. The flowchart 1500 continues to module 1504 with providing, in response to the first request, the first collaborative online content editor client with a first intermediary collaborative content product based on a latest version of the collaborative content product. When providing the first intermediary collaborative content product, the module 1504 may cause the first intermediary collaborative content product to be maintained and stored at the server or, alternatively, cause the first intermediary collaborative content product to be sent to the client where will be maintained and stored.

In the example of FIG. 15, the flowchart 1500 continues to module 1506 with receiving at the server a second request by a second collaborative online content editor client to modify the collaborative content product. The flowchart 1500 continues to module 1508 with providing, in response to the second request, the second collaborative online content editor client with a second intermediary collaborative content product based on a latest version of the collaborative content product. When providing the second intermediary collaborative content product, the module 1504 may cause the second intermediary collaborative content product to be maintained and stored at the server or, alternatively, cause the second intermediary collaborative content product to be sent to the client where will be maintained and stored.

It should be understood that the order in which the server receives the first request and the second request, and the order in which the server provides the first intermediary collaborative content product and the second intermediary collaborative content product can be arbitrary.

In the example of FIG. 15, the flowchart 1500 continues to module 1510 with providing a first version of a library content item for the first collaborative online content editor client to use as the first collaborative content editor client modifies the first intermediary collaborative content product or for the second collaborative online content editor client to use as the second collaborative content editor client modifies the second intermediary collaborative content product.

Depending on the embodiments, the first version can comprise a lower quality version of the library content item while the second version comprises a higher quality version of the library content item, the first version can comprise a derivative version of the library content item while the second version comprises an original version of the library content item, the first version can comprise a watermarked version of the library content item while the second version comprises a non-watermarked version of the library content, and the first version can comprise a first copyright right limited version of the library content item while the second version comprises a second copyright limited version of the library content. As noted herein, the library content item can comprise an image, an audio clip, a video clip, user-provided content, third party-provided content, payment-free content, or for-purchase content.

In the example of FIG. 15, the flowchart 1500 continues to module 1512 with receiving a first modification applied to the first intermediary collaborative content product by the first collaborative online content editor client. The flowchart 1500 continues to module 1514 with receiving a second modification applied to the second intermediary collaborative content product the second collaborative online content editor client. The first and/or second modification (applied to the respective intermediary collaborative content products) may comprise of a list of modification instructions (e.g., including layer information, content information, and/or timeline information), a set of modified portions of the respective intermediary collaborative content product, or an entire intermediary collaborative content product as modified. As described herein, where a given intermediary collaborative content product resides at the server, receiving a modification applied to the given intermediary collaborative content product can be an internal process of the server where the server obtains the modification from the given intermediary collaborative content product. Where the given intermediary collaborative content product resides at the client, receiving a modification applied to the given intermediary collaborative content product can comprise receiving the modification at the server from the client.

In the example of FIG. 15, the flowchart 1500 continues to module 1516 with modifying the collaborative content product in accordance with the first modification and the second modification. Depending on the embodiment, modifying the collaborative content product in accordance with the first modification and the second modification can comprises serially modifying the collaborative content product in accordance with the with the first modification and then modifying the collaborative content product in accordance with the second modification. This may occur when, for example, the first modification is received before the second modification is received by the collaborative online content editing server engine. This may also occur when, for example, the first modification is associated with a first collaborative user (e.g., administrative user, or content project lead), the second modification is associated with a second collaborative user (e.g., regular user), and the first collaborative user has a higher user credential than the second collaborative user.

As noted herein, modifying the collaborative content product in accordance with the first modification can comprise entirely replacing the collaborative content product with the first intermediary collaborative content product as modified. Alternatively, modifying the collaborative content product in accordance with the first modification can comprise applying a difference between the collaborative content product and the first intermediary collaborative content product as modified to the collaborative content product. How the modification is performed can depend on user preferences, administrative preferences, or predetermined settings of the collaborative system. It will be well appreciated by those skilled in the art that the collaborative content product can, in some embodiments, be modified in accordance with the second modification in a similar manner.

In the example of FIG. 15, the flowchart 1500 continues to step 1518 with rendering the collaborative content product as rendered collaborative content product using a second version of the library content item in place of the first version of the library content item.

Figure 16:
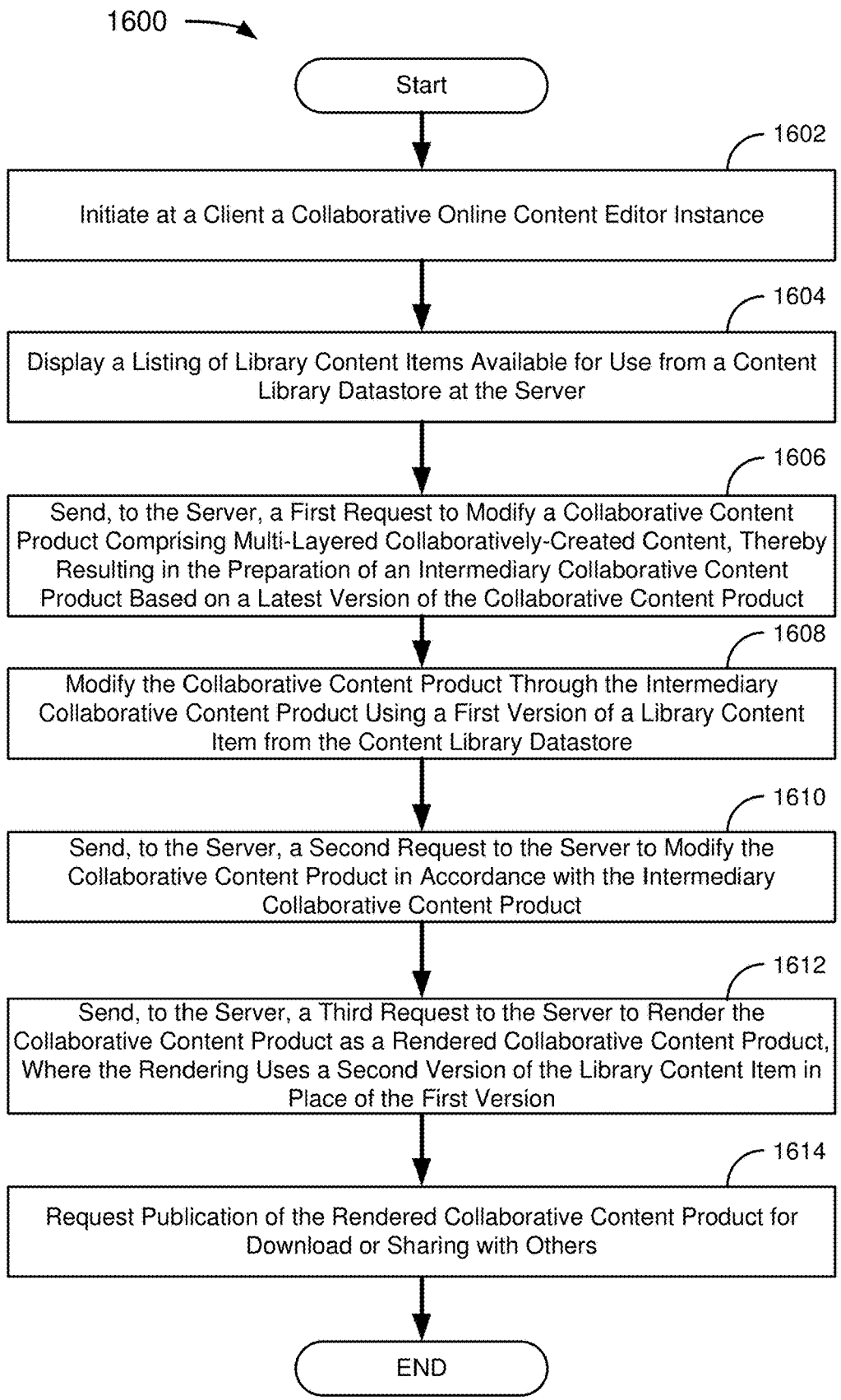
FIG. 16 depicts a flowchart of an example of a client-side method for collaborative online content editing in accordance with some embodiments.

FIG. 16 depicts a flowchart 1600 of an example of a client-side method for collaborative online content editing in accordance with some embodiments. In some implementations, the modules of the flowchart 1600 and other flowcharts described in this paper are rendered to a permutation of the illustrated order of modules or reorganized for parallel execution. In the example of FIG. 16, the flowchart 1600 starts at module 1602 with initiating at a client a collaborative online editor instance.

In the example of FIG. 16, the flowchart 1600 continues to module 1604 with the collaborative online editor instance displaying a listing of library content items available for use from a content library datastore at a server.

In the example of FIG. 16, the flowchart 1600 continues to module 1606 with the collaborative online editor instance sending, to the server, a first request to modify a collaborative content product comprising multi-layered collaboratively-created content, thereby resulting in the preparation of an intermediary collaborative content product based on a latest version of the collaborative content product. As noted herein, the intermediary collaborative content product once prepared by the server, may reside at the server or be sent to the client for maintenance and storage.

In the example of FIG. 16, the flowchart 1600 continues to module 1608 with modifying the collaborative content product through the intermediary collaborative content product using a first version of a library content item from the content library datastore. As described herein, where the intermediary collaborative content product resides at the server, the client can instruct the server to perform the modification operations to the intermediary collaborative content product. Where the intermediary collaborative content product resides at the client, the client can directly perform the modification operations on the intermediary collaborative content product, and then transmit the modifications performed on the intermediary content product to the server.

Eventually the modification applied to the intermediary content product is consistently applied to the collaborative content product. As such, the flowchart 1600 continues to module 1610 with sending, to the server, a second request to the server to modify the collaborative content product in accordance with the intermediary collaborative content product.

In the example of FIG. 16, the flowchart 1600 continues to module 1612 with sending, to the server, a third request to the server to render the collaborative content product as a rendered collaborative content product, where the rendering uses a second version of the library content item in place of the first version.

In the example of FIG. 16, the flowchart 1600 continues to module 1614 with requesting publication of the rendered collaborative content product for download or sharing with others.

Figure 17:
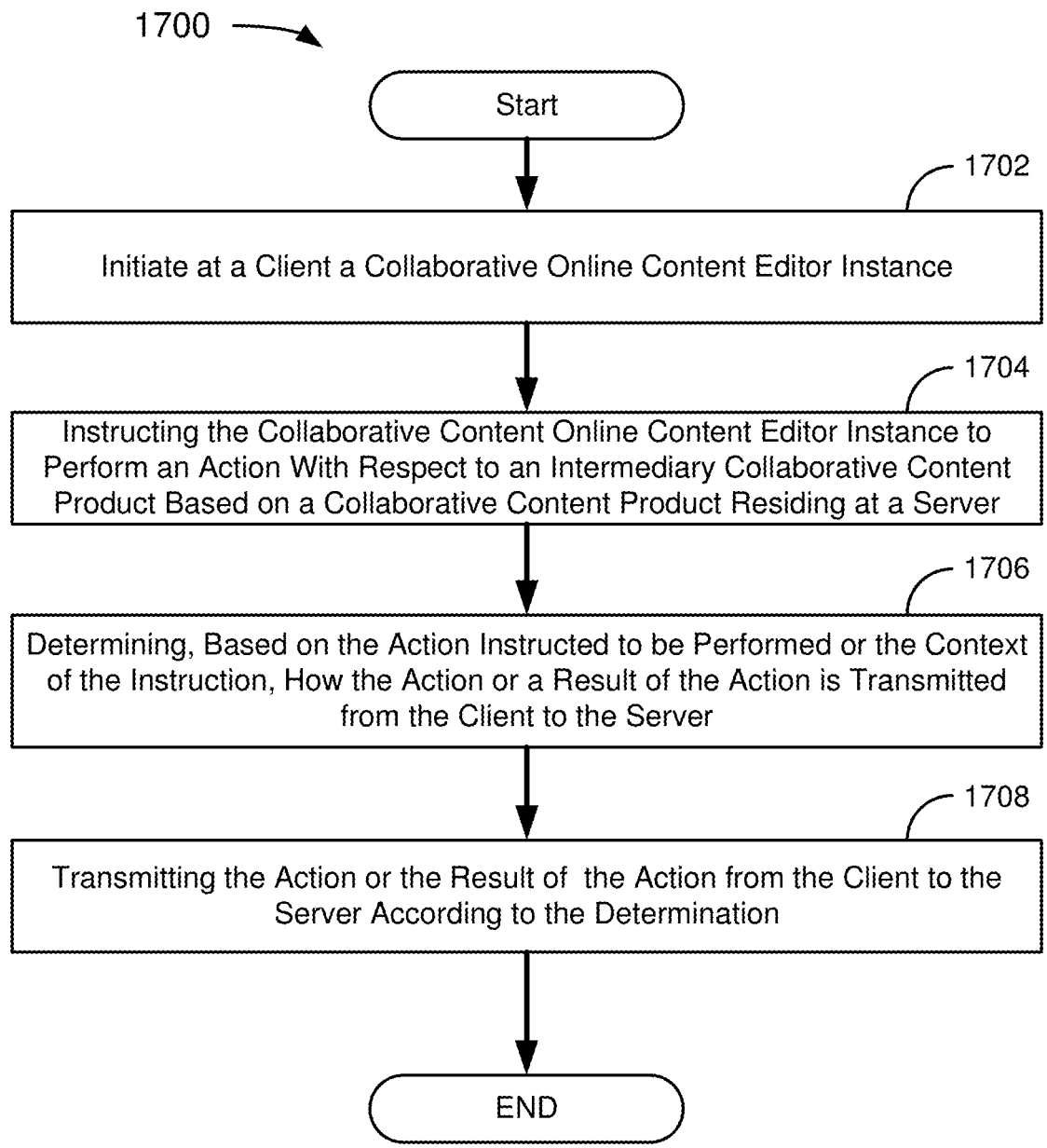
FIG. 17 depicts a flowchart of an example of an optimization method for collaborative online content editing in accordance with some embodiments.

FIG. 17 depicts a flowchart of an example of an optimization method for collaborative online content editing in accordance with some embodiments. Use of the optimization method can, for some embodiments, allow for efficient use of network bandwidth between an online low-bandwidth consumption client and an online low-bandwidth consumption server and/or allow for less processing time during content modification operations. Depending on the embodiment, the optimization method can be implemented at a collaborative online content editor client, at a collaborative online content editor server, or both. Once implemented, the optimization method can determine how and when data transfer between the collaborative online content editor client and the collaborative online content editor server can be performed in a manner which reduces the amount of data being transferred. Generally, the optimization method makes the transfer determination based on the type of action instructed to be performed, based on the context in which action is instructed to be performed, preferences set at the online low-bandwidth consumption client or the online low-bandwidth consumption server, or some combination thereof.

Those skilled in the art will appreciate that depending on the implementation, the optimization method can be implemented for content transfer from the online low-bandwidth consumption client to the collaborative online content editor server, can be implemented for content transfer from the collaborative online content editor server to the collaborative online content editor client, or both. Additionally, though the optimization methods described herein are primarily described in association with content transfers, those skilled in the art will appreciate that the optimization methods can be utilized for other information being transferred between collaborative online content editor client and the collaborative online content editor server including, for example, timeline information. Furthermore, in some implementations, the modules of the flowchart 1700 and other flowcharts described in this paper are reordered to a permutation of the illustrated order of modules or reorganized for parallel execution.

In the example of FIG. 17, the flowchart 1700 starts at module 1702 with initiating at a client a collaborative online editor instance. Once initiated, a user at the client can issue commands, such as content creation or modification commands relating to the collaborative content product, through the collaborative online content editor instance to the server. In response, the collaborative online content editor instance can instruct the server to perform operations on the collaborative content product residing at the server via an intermediary collaborative content product, which may be residing at the server or residing at the client. As noted herein, the client can be implemented by any known or convenient computing device including, for example, mobile computing devices, netbooks, and desktop. Generally, the server possesses computing resources in excess of those of the client, or the server possesses computing resources better suited for content creation or modification than those of the client.

In the example of FIG. 17, the flowchart 1700 continues to module 1704, instructing the collaborative content online content editor instance to perform an action with respect to the intermediary collaborative content product, which is based on the collaborative content product. Examples of actions can include modification of a layer in the intermediary collaborative content product, changing attributes of the intermediary collaborative content product, adding, removing content, or adjusting content items in the intermediary collaborative content product, or updating the collaborative content product with the current version of the intermediary collaborative content product.

The context in which the instruction to perform the action is made, or the action to be performed can have an influence on how the method optimizes data transfers between the client and server. Examples of context aspects that can be considered include whether the instruction is requested in a collaborative setting (e.g., where two or more collaborative online content editor clients are modifying a single collaborative content product), content editor user preferences (e.g., early start on rendering processes), and whether one or more other instructions have been requested concurrently with the instruction requested at module 1704.

In the example of FIG. 17, the flowchart 1700 continues to module 1706 with determining based on the action instructed to be performed or the context of the instruction, how the action or a result of the action is transmitted from the client to the server. In one example, where a content editor user indicates a preference (e.g., through user settings) for server processes (e.g., rendering or conversion) to be performed on content as early as possible (e.g., as content data begins to arrive at the server from the client), the module 1706 can determine that any upload of intermediary collaborative content product from the client to the server should be transferred in parts (e.g., content data chunks or segments), thereby enabling the server to commence processing of the content as the parts are received (rather than waiting for the intermediary collaborative content product in its entirety). By transferring data from the client to the server in parts, the client can cause the server to pause or stop content processing mid-performance (e.g., collaborative content product update process when a mistake is discovered in the modified intermediary collaborative content product), thereby potentially saving time and resources.

In yet another example, two or more collaborative online content editor users are collaboratively performing content edits to the same collaborative content product, where each content editor user is respectively editing his or her respective intermediary collaborative content product residing locally at the content editor user's client. In such an instance, the module 1706 can determine that portions of the intermediary collaborative content product residing at the respective clients are to be uploaded to the server as the portions are modified by the individual content editor users. In doing so, various implementation can try to ensure that the latest changes applied by individual collaborative users to the user-created content can be shared amongst other collaborative users.

In the example of FIG. 17, the flowchart 1700 continues to step 1708 with transmitting the action or the result of the action from the client to the server according to the determination.

Figure 18:
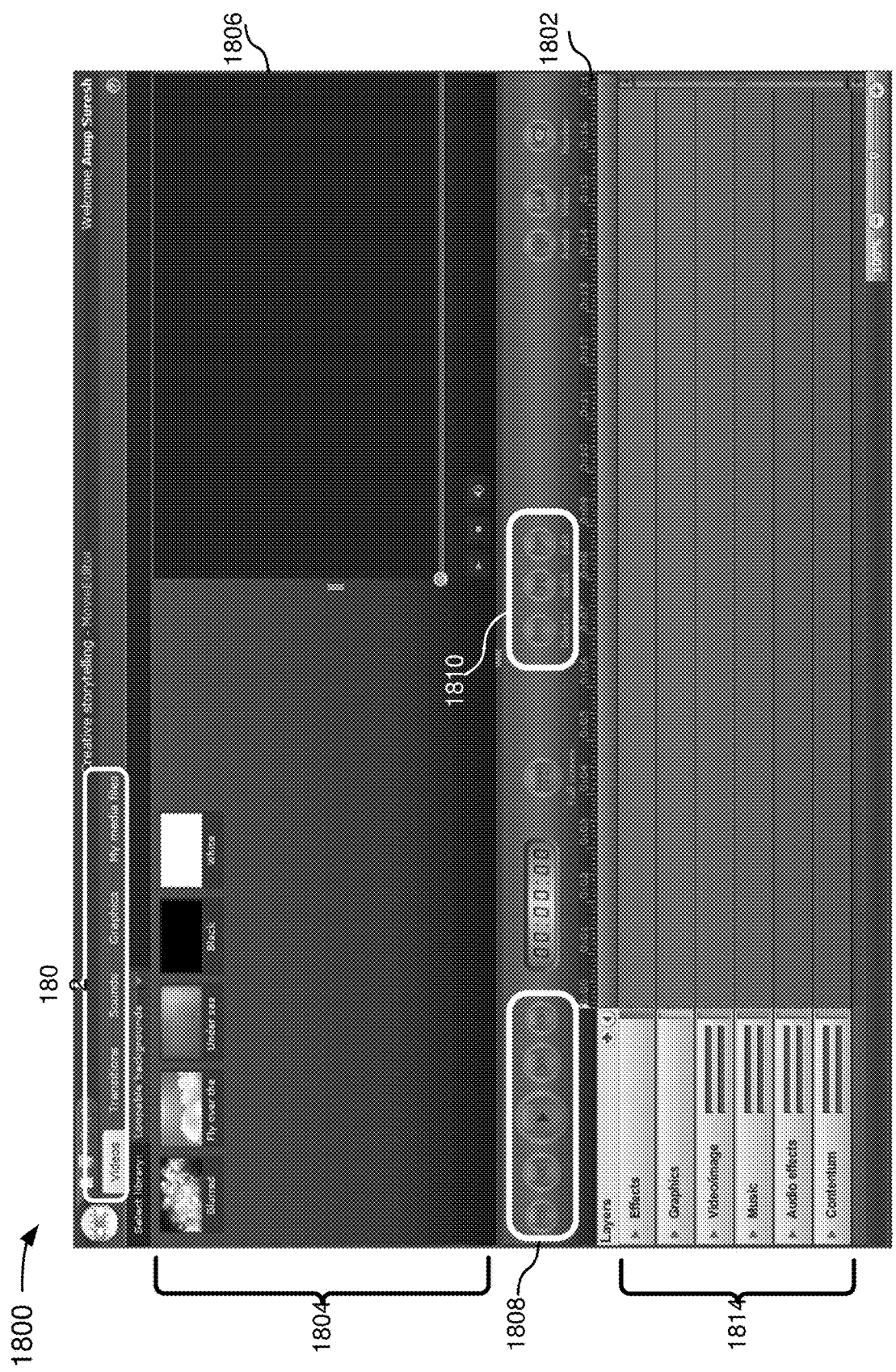
FIG. 18 depicts an example of client-side user interface for collaborative online content editing in accordance with some embodiments.

FIG. 18 depicts an example of client-side user interface for collaborative online content editing in accordance with some embodiments. With respect to some implementations, the client-side user interface of FIG. 18 can control the content creation and editing operations performed on a collaborative content being developed collaboratively by two or more users. In particular, the client-side user interface can control a collaborative online content editing client engine operating at a client, a collaborative online content editing server engine operation at a server, or both to facilitate the creation and editing operations on the collaborative content. As described herein, for various implementations, the client-side user interface can cause various engines to operate such that an intermediary collaborative content product is prepared by the server and received by a client from the server, the intermediary collaborative content product is updated/modified at the client, and the updated/modified intermediary collaborative content product is sent back to the server (e.g., in order to update the latest version of the collaborative content product residing at the server).

Additionally or alternatively, the client-side user interface can cause various engines to operate such that an intermediary collaborative content prepared and stored at a server on behalf of the client, the client instructs the server to perform update/modification operations on the intermediary content product, and the client instructs the server to update/modify the collaborative content product (e.g., possibly the latest version of the collaborative content product) using the updated/modified intermediary collaborative content product at the server. The behavior and/or results of the client-side user interface based on user input can be based on individual user preferences, administrative preferences, predetermined settings, or some combination thereof.

The client-side user interface can be configured such that a user can request performance of creation and modification operations on the collaborative content product being collaboratively developed. The client-side user interface can be transferred from a server to a client as a module that can then be operated on the client. For example, the client-side user interface can comprise a client-side applet or script that is downloaded to the client from the server and then operated at the client (e.g., through a web browser). Additionally, the client-side user interface can operate through a plug-in that is installed in a web browser. User input to the client-side user interface can cause a command relating to online content editing, such as a content layer edit command or a content player/viewer command, to be performed at the client or to be transmitted from the client to the server.

The client-side user interface 1800 includes multiple controls and other features that enable a user at a client to control the creation or modification of collaborative content products. In the example of FIG. 18, the client-side user interface 1800 includes a tabbed menu bar 1802, a content listing 1804, a content player/viewer 1806, content player/viewer controls 1808, content layer editor control 1810, a content timeline indicator 1812, and a content layering interface 1814.

In the example of FIG. 18, the client-side user interface 1800 includes the tabbed menu bar 1802 that allows the user to select between different content types (e.g., video, audio, or images) as they search for content available to them from a content library. Here, the tabbed menu bar 1802 allows the user to select between reviewing "Videos," "Sounds," "Graphics" (e.g., text or images), or personal (media) content (i.e., "My media files") that is available from the content library. The personal content can be that which the user uploaded to their account on the server, that which the user already created on the server, or both. Those of ordinary skill in the art would appreciate that in some embodiments, the tabbed menu bar 1802 can include additional content types (e.g., "3D Video") from which the user can select as they search for content available to them from the content library.

The tabbed menu bar 1802 also enables the user to select "Transitions," which can be predefined (e.g., vendor provided), user-created, or collaboratively-created content transitions inserted between two content items in a layer of collaboratively-created content. For instance, with respect to video content (i.e., video clips), available transitions can include a left-to-right video transition which once inserted between a first video clip and a second video clip, cause the first video clip transition to the second video clip in a left-to-right manner. Likewise, with respect to audio content (i.e., audio clips), available transitions can include a right-to-left transition which once inserted between a first audio clip and a second audio clip, causes the first audio clip to fade into to the second audio clip starting from the right audio channel and ending at the left audio channel.

As the user selects between the content types in the tabbed menu bar 1802, a listing of available content matching the selected content type can be displayed to the user accordingly. In the example of FIG. 18, the content listing 1804 displays a list of content available from the content library. For some embodiments, the content listing 1804 can list the available content with a thumbnail image configured to provide the user with a preview of the content. For example, for video content, the thumbnail image may be a moving image that provided a brief preview of the video content. With respect to image content, the thumbnail preview may be a smaller sized version (i.e., lower resolution version) of the image content. In certain embodiments, a content item listed in content listing 18018 can be further previewed in a content player/viewer 1806, configured to play audio or video or display larger resolution images. The content listing 1804 can also provide details regarding the listed content including, without limitation, a source of the content, a date of creation for the content, a data size of the content, a time duration of the content (where applicable), licensing information relating to the content, and cost of using the content.

In the example of FIG. 18, a user can utilize the content player/viewer 1806 to preview content items from the content library listed in the content listing 1804. The content player/viewer 1806 can also provide a preview of collaboratively-created content being created through the client-side user interface 1800. In one example, the user can create collaboratively-created content, containing one or more video and audio content items from the content library, and then preview that collaboratively-created content through the content player/viewer 1806. Depending on the embodiment, the content being previewed can be from a latest version of the collaborative content product residing at the server, a rendered version of the collaborative content product residing at the server, a latest version of the intermediary collaborative content product residing at the server for the client, or a latest version of the intermediary collaborative content product locally residing at the client. Where content being played or shown is provided from the server, such content can be streamed from the server to the client as such the content is played or shown through the content player/viewer 1806. In some embodiments, where content being played or shown is provided from the server, such content can be first downloaded to the client before it is played or shown through the content player/viewer 1806.

As described herein, the content library items or the collaborative content product shown through the content player/viewer 1806 can be of a proxy version rather than the actual version of the content residing on the server or the content that is eventually rendered by the server. Because the proxy content requires less bandwidth when being transferred from the server to a client, some embodiments can lower the data bandwidth consumption between the client and server as content is created, edited, rendered or previewed through the client-side user interface 1800, and can possibly decrease processing time at the client and/or the server during creation, modification, rendering, or preview operations.

In the example of FIG. 18, a user controls the operations of the content player/viewer 1806 using the content player/viewer controls 1808. The content player/viewer controls 1808 can include control commands common to various players, such as previous track, next track, fast-backward, fast-forward, play, pause, and stop. For some embodiments, a user input to the content player/viewer controls 1808 can result in a content player/viewer command instruction being transmitted from the client to the server.

In the example of FIG. 18, the content layer editor control 1810 comprises controls that enable the user to edit content layers of collaborative content product. Through the content layer editor control 1810, a user can implement edits to a content layer of the collaborative content product residing on the server. The content layer editor control 1810 can include edit controls that enable a user to add, delete or modify one or more content layers of collaborative content product. Example edit controls include, without limitation, adding a content layer, deleting a content layer, splitting a single content layer into two or more content layers, and editing properties of a content layer.

In the example of FIG. 18, the content timeline indicator 1812 visually assists a user in determining a temporal position of a content layer in collaborative content product or a content item in the content layer. For instance, the content timeline indicator 1812 can comprise a time marker that indicates a temporal start point or a temporal end point for a content layer or a content item in the content layer. In some embodiments, the length of the content timeline indicator 1812 can adapt according to the overall duration of the collaboratively-created creation, or can be adjusted according to a user-setting.

In the example of FIG. 18, the content layering interface 1814 enables a user to access and modify content layers of the collaborative content product. The content layering interface 1814 can comprise a stack of content layer slots, where each content layer slot graphically presents all the content layers of a particular content type associated to the collaborative content product. Example content types include, without limitation, graphical content (e.g., "Graphics"), video content (e.g., "Video"), image content (e.g., "Image"), and audio content (e.g., "Audio effects"). The content layering interface 1814 can also comprise image, video or audio effects, which can be applied to the various content types.

In some embodiments, the user can add content to a new or existing content layer of the collaborative content product by "dragging-and-dropping" content items from the content listing 1804 into the content layering interface 1814. Further, in various embodiments, the user can graphically modify a temporal position or duration of a content layer or a content item within the content layer. For instance, the user can drag-and-drop the graphically represented start or end of a content item to adjust the duration of the content item (thereby the temporal start of temporal end of the content item) in the collaborative content product.

Figure 19:
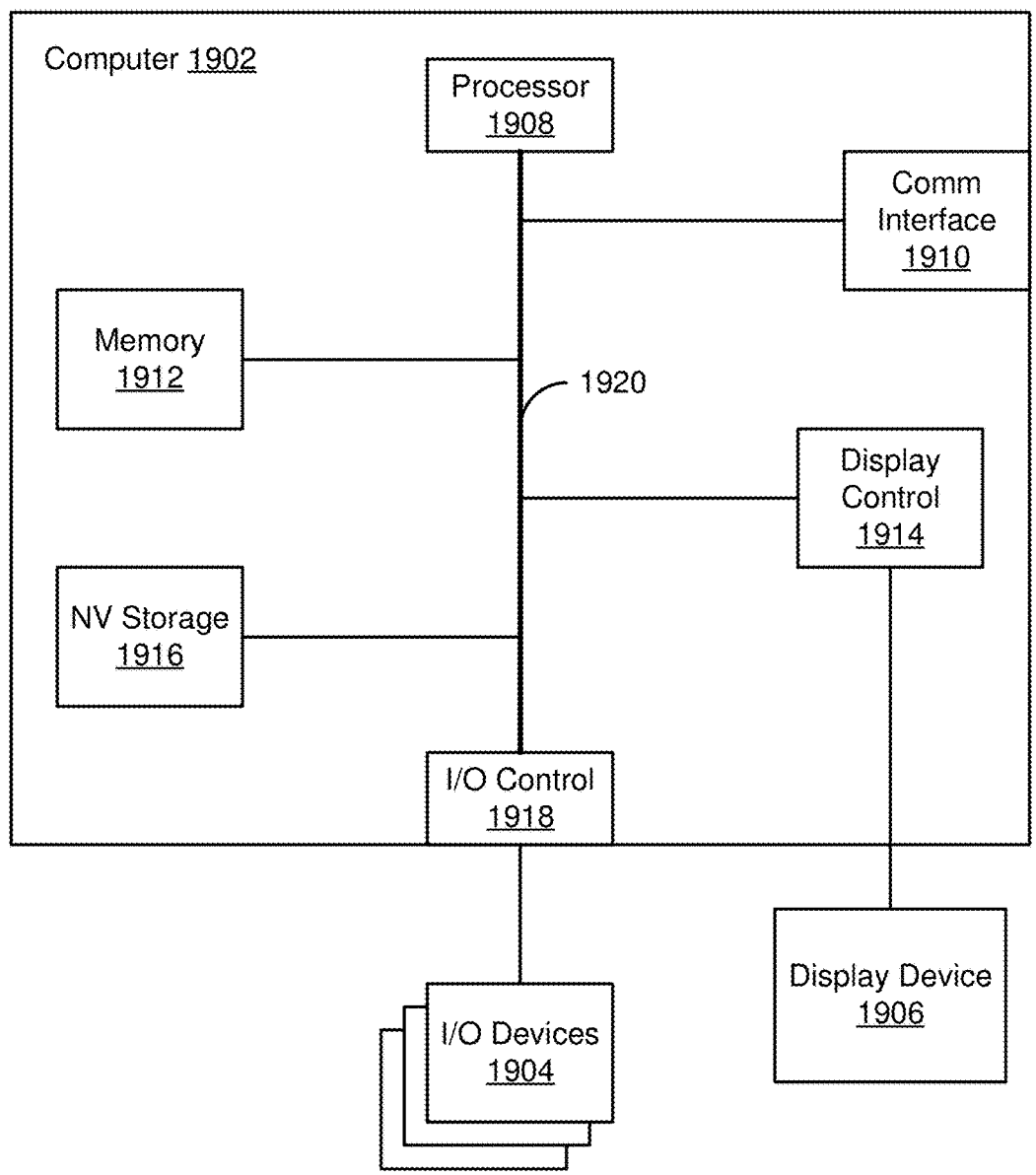
FIG. 19 depicts an example of a system on which techniques described in this paper can be implemented.

FIG. 19 depicts an example of a system on which techniques described in this paper can be implemented. The computer system 1900 may be a conventional computer system that can be used as a client computer system, such as a wireless client or a workstation, or a server computer system. The computer system 1900 includes a computer 1902, I/O devices 1904, and a display device 1906. The computer 1902 includes a processor 1908, a communications interface 1910, memory 1912, display controller 1914, non-volatile storage 1916, and I/O controller 1918. The computer 1902 may be coupled to or include the I/O devices 1904 and display device 1906.

The computer 1902 interfaces to external systems through the communications interface 1910, which may include a modem or network interface. It will be appreciated that the communications interface 1910 can be considered to be part of the computer system 1900 or a part of the computer 1902. The communications interface 1910 can be an analog modem, ISDN modem, cable modem, token ring interface, satellite transmission interface (e.g. "direct PC"), or other interfaces for coupling a computer system to other computer systems.

The processor 1908 may be, for example, a conventional microprocessor such as an Intel Pentium microprocessor or Motorola power PC microprocessor. The memory 1912 is coupled to the processor 1908 by a bus 1920. The memory 1912 can be Dynamic Random Access Memory (DRAM) and can also include Static RAM (SRAM). The bus 1920 couples the processor 1908 to the memory 1912, also to the non-volatile storage 1916, to the display controller 1914, and to the I/O controller 1918.

The I/O devices 1904 can include a keyboard, disk drives, printers, a scanner, and other input and output devices, including a mouse or other pointing device. The display controller 1914 may control in the conventional manner a display on the display device 1906, which can be, for example, a cathode ray tube (CRT) or liquid crystal display (LCD). The display controller 1914 and the I/O controller 1918 can be implemented with conventional well known technology.

The non-volatile storage 1916 is often a magnetic hard disk, an optical disk, or another form of storage for large amounts of data. Some of this data is often written, by a direct memory access process, into memory 1912 during execution of software in the computer 1902. One of skill in the art will immediately recognize that the terms "machine-readable medium" or "computer-readable medium" includes any type of storage device that is accessible by the processor 1908 and also encompasses a carrier wave that encodes a data signal.

The computer system 1900 is one example of many possible computer systems which have different architectures. For example, personal computers based on an Intel microprocessor often have multiple buses, one of which can be an I/O bus for the peripherals and one that directly connects the processor 1908 and the memory 1912 (often referred to as a memory bus). The buses are connected together through bridge components that perform any necessary translation due to differing bus protocols.

Network computers are another type of computer system that can be used in conjunction with the teachings provided herein. Network computers do not usually include a hard disk or other mass storage, and the executable programs are loaded from a network connection into the memory 1912 for execution by the processor 1908. A Web TV system, which is known in the art, is also considered to be a computer system, but it may lack some of the features shown in FIG. 19, such as certain input or output devices. A typical computer system will usually include at least a processor, memory, and a bus coupling the memory to the processor.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Techniques described in this paper relate to apparatus for performing the operations. The apparatus can be specially constructed for the required purposes, or it can comprise a general purpose computer selectively activated or reconfigured by a computer program stored in the computer. Such a computer program may be stored in a computer readable storage medium, such as, but is not limited to, read-only memories (ROMs), random access memories (RAMs), EPROMs, EEPROMs, magnetic or optical cards, any type of disk including floppy disks, optical disks, CD-ROMs, and magnetic-optical disks, or any type of media suitable for storing electronic instructions, and each coupled to a computer system bus.

Although the foregoing embodiments have been described in some detail for purposes of clarity of understanding, the invention is not necessarily limited to the details provided.

The invention claimed is:

1. A system, comprising:
one or more processors, and
memory storing instructions that, when executed by the one or more processors, cause the system to perform:
using a multi-source content acquisition engine to provide an instruction to launch an editor window to display a set of selectable content generated by a plurality of remote sources and stored in the content datastore;
configuring a multi-source content selection engine identifies a set of selected content from the set of selectable content;
using an integrated content arrangement engine arranges the set of selected content into a multi-sourced journal content sequence;
using a layer integration engine applies a layer from the layer datastore to a portion of the multi-sourced journal content sequence;
providing an instruction to display, using a multi-source content launch engine, an integrated multi-sourced journal content sequence including the multi-sourced journal content sequence and the layer in the editor window, wherein if an entity editing the multi-source journal content does not have rights to any of the multi-source journal content sequence and the applied layer from the layer datastore, the multi-source content launch engine performs one or more of limiting a viewing quality of the integrated multi-source journal content sequence, applying a watermark that renders the integrated multi-source journal content sequence unpublishable, and applying a seal that renders the integrated multi-source journal content sequence unpublishable.

2. The system of claim 1, further comprising a multi-source channel publication engine coupled to the layer integration engine, wherein, in operation, the multi-source channel publication engine creates a multi-source content channel comprising the integrated multi-sourced journal content sequence.

3. The system of claim 1, further comprising a multi-source content search engine coupled to the content datastore and the multi-source content acquisition engine, wherein, in operation, the multi-source content search engine:
receives a request from the multi-source content acquisition engine to search the content datastore for subject-specific content;
provides the subject-specific content to the multi-source content acquisition engine.

4. The system of claim 1, further comprising a collaborative edit aggregation engine coupled to the layer datastore and the layer integration engine;
wherein, in operation, the collaborative edit aggregation engine provides to the layer integration engine a plurality of instructions comprising:
a first instruction from a first remote source to apply a first layer from the layer datastore to the portion of the multi-sourced journal content sequence;
a second instruction from a second remote source to apply a second layer from the layer datastore to the portion of the multi-sourced journal content sequence.

5. The system of claim 1, further comprising a collaborative edit launch engine coupled to the multi-source content acquisition engine, wherein, in operation, the collaborative edit launch engine:
receives the instruction to launch the editor window from the multi-source content acquisition engine;
launches a first editor window on a first edit client and a second editor window on a second edit client based on the instruction to launch the editor window.

6. The system of claim 1, further comprising a collaborative layer placement engine coupled to the layer integration engine, wherein, in operation, the collaborative layer placement engine provides to the layer integration engine a first layer received from a first editor window and a second layer received from a second editor window.

7. The system of claim 1, further comprising a journalism sourcing engine coupled to the multi-source content acquisition engine and the content datastore;
wherein, in operation, the journalism sourcing engine provides to the multi-source acquisition engine:
first user-generated coverage of an event obtained from a first citizen journalist;
second user-generated coverage of the event obtained from a second citizen journalist.

8. The system of claim 1, further comprising a content marketplace engine coupled to the content datastore, which in operation, facilitates user-based exchange of user-generated journal content.

9. The system of claim 1, further comprising a content scrapbooking engine coupled to the multi-source content acquisition engine and the content datastore, which in operation, provides to the content datastore user-generated social history content.

10. A method, comprising:
using a multi-source content acquisition engine to provide an instruction to launch an editor window to display a set of selectable content generated by a plurality of remote sources and stored in a content datastore;

configuring a multi-source content selection engine to identify a set of selected content from the set of selectable content;

using an integrated content arrangement engine to arrange the set of selected content into a multi-sourced journal content sequence;

using a layer integration engine to apply a layer from a layer datastore to a portion of the multi-sourced journal content sequence; and providing an instruction to display, using a multi-source content launch engine, an integrated multi-sourced journal content sequence including the multi-sourced journal content sequence and the layer in the editor window, wherein if an entity editing the multi-source journal content does not have rights to any of the multi-source journal content sequence and the applied layer from the layer datastore, the multi-source content launch engine performs one or more of limiting a viewing quality of the integrated multi-source journal content sequence, applying a watermark that renders the integrated multi-source journal content sequence unpublishable, and applying a seal that renders the integrated multi-source journal content sequence unpublishable.

11. The method of claim 10, further comprising using a multi-source channel publication engine to create a multi-sourced content channel comprising the integrated multi-sourced journal content sequence.

12. The method of claim 10, further comprising:

using a multi-source content search engine to receive a request from the multi-source content selection engine to search the content datastore for subject-specific content;

using the multi-source content search engine to provide the subject-specific content to the multi-source content selection engine.

13. The method of claim 10, further comprising using a collaborate edit aggregation engine to provide to the layer integration engine a plurality of instructions comprising:

a first instruction from a first remote source to apply a first layer from the layer datastore to the portion of the multi-sourced journal content sequence;

a second instruction from a second remote source to apply a second layer from the layer datastore to the portion of the multi-sourced journal content sequence.

14. The method of claim 10, further comprising using a collaborative edit launch engine to: receive the instruction to launch the editor window from the multi-source content acquisition engine;

launch a first editor window on a first edit client and a second editor window on a second edit client based on the instruction to launch the editor window.

15. The method of claim 10, further comprising using a collaborative layer placement engine to provide to the layer integration engine a first layer received from a first editor window and a second layer received from a second editor window.

16. The method of claim 10, further comprising using a journalism sourcing engine to provide to the multi-source content acquisition engine:

first user-generated coverage of an event obtained from a first citizen journalist;

second user-generated coverage of the event obtained from a second citizen journalist.

17. The method of claim 10, further comprising facilitating user-based exchange of user-generated journal content.

18. The method of claim 10, further comprising using a content scrapbooking engine to provide to the multi-source content acquisition engine user-generated social history content.

* * * * *